(12) United States Patent
Chandrasekaran et al.

(10) Patent No.: US 11,922,043 B2
(45) Date of Patent: Mar. 5, 2024

(54) DATA MIGRATION BETWEEN STORAGE SYSTEMS

(71) Applicant: EMC IP Holding Company LLC, Hopkinton, MA (US)

(72) Inventors: Siva Shankari Chandrasekaran, Bangalore (IN); Gopinath Sekar, Chennai (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 17/381,301

(22) Filed: Jul. 21, 2021

(65) Prior Publication Data
US 2022/0391120 A1    Dec. 8, 2022

(30) Foreign Application Priority Data

Jun. 8, 2021   (IN) .............................. 202111025385

(51) Int. Cl.
| | |
|---|---|
| *G06F 12/00* | (2006.01) |
| *G06F 3/06* | (2006.01) |
| *G06F 9/455* | (2018.01) |
| *G06F 13/00* | (2006.01) |

(52) U.S. Cl.
CPC .......... *G06F 3/0647* (2013.01); *G06F 3/0604* (2013.01); *G06F 3/065* (2013.01); *G06F 3/067* (2013.01); *G06F 9/45512* (2013.01)

(58) Field of Classification Search
CPC ...... G06F 3/0647; G06F 3/0604; G06F 3/065; G06F 3/067; G06F 9/45512

USPC ......................................................... 711/165
See application file for complete search history.

(56) References Cited

U.S. PATENT DOCUMENTS

| | | | | |
|---|---|---|---|---|
| 4,393,445 A  * | 7/1983 | Milligan | ................ | G06F 3/0601 360/72.2 |
| 6,701,411 B2 * | 3/2004 | Matsunami | ........... | G06F 3/0689 711/161 |
| 7,194,538 B1 * | 3/2007 | Rabe | ........................ | H04L 67/75 709/224 |
| 7,219,189 B1 * | 5/2007 | Ryu | ........................ | G06F 3/0631 711/111 |
| 7,328,260 B1 * | 2/2008 | Muthiyan | ................ | H04L 41/12 711/170 |
| 7,401,338 B1 * | 7/2008 | Bowen | ................ | H04L 67/1097 709/200 |

(Continued)

*Primary Examiner* — Sheng Jen Tsai
(74) *Attorney, Agent, or Firm* — Muirhead and Saturnelli, LLC

(57) ABSTRACT

Described herein are techniques and mechanisms for migrating data in a flexible and platform-independent manner that does not require installation on a customer site to be executed. In some embodiments, a software tool may be written in a scripting language, which may be interpreted at run-time as opposed to requiring compilation beforehand. The tool may include multiple modules, where each module may be configured to perform one or more specific functions in accordance with the invention, and each module may be capable of receiving and outputting data in a flat-file format, for example, with comma-delimited values. The software tool may present a command-line interface (CLI) that enables a user to specify execution of one or more actions by entering commands on a command line.

20 Claims, 9 Drawing Sheets

(56) References Cited

U.S. PATENT DOCUMENTS

| | | | | |
|---|---|---|---|---|
| 7,403,987 B1* | 7/2008 | Marinelli | H04L 43/0817 | 709/224 |
| 7,664,839 B1* | 2/2010 | Karr | G06F 3/0632 | 709/227 |
| 7,774,444 B1* | 8/2010 | George | H04L 41/145 | 709/224 |
| 7,886,031 B1* | 2/2011 | Taylor | H04L 41/0873 | 709/224 |
| 8,019,849 B1* | 9/2011 | Lopilato | G06F 16/1827 | 709/224 |
| 8,200,637 B1* | 6/2012 | Stringham | G06F 11/1451 | 707/670 |
| 10,282,433 B1* | 5/2019 | Caruso | G06F 16/258 | |
| 10,637,666 B1* | 4/2020 | Blankstein | G06F 3/0647 | |
| 2003/0179748 A1* | 9/2003 | George | H04L 63/101 | 370/392 |
| 2003/0208589 A1* | 11/2003 | Yamamoto | H04L 41/0853 | 709/224 |
| 2005/0268147 A1* | 12/2005 | Yamamoto | G06F 11/0727 | 714/E11.089 |
| 2006/0095700 A1* | 5/2006 | Sato | G06F 3/0605 | 711/170 |
| 2008/0095152 A1* | 4/2008 | George | H04L 49/3009 | 370/389 |
| 2009/0287898 A1* | 11/2009 | Hara | H04L 61/5038 | 711/170 |
| 2011/0307657 A1* | 12/2011 | Timashev | G06F 11/1464 | 711/E12.001 |
| 2012/0203988 A1* | 8/2012 | Nakagawa | G06F 11/2074 | 711/E12.103 |
| 2013/0046892 A1* | 2/2013 | Otani | G06F 9/455 | 709/226 |
| 2013/0339643 A1* | 12/2013 | Tekade | G06F 16/128 | 711/162 |
| 2014/0149666 A1* | 5/2014 | Nakagawa | G06F 3/065 | 711/114 |
| 2015/0039717 A1* | 2/2015 | Chiu | H04L 67/1097 | 709/214 |
| 2015/0082218 A1* | 3/2015 | Affoneh | G06F 9/451 | 715/771 |
| 2015/0378771 A1* | 12/2015 | Tarasuk-Levin | G06F 9/45558 | 718/1 |
| 2016/0077926 A1* | 3/2016 | Mutalik | G06F 16/1844 | 711/162 |
| 2016/0105321 A1* | 4/2016 | Thakkar | H04L 41/0883 | 709/220 |
| 2020/0133895 A1* | 4/2020 | Crowley | G06F 9/45558 | |
| 2020/0136897 A1* | 4/2020 | Smith | H04L 41/0659 | |
| 2020/0145282 A1* | 5/2020 | Copley | H04L 49/25 | |
| 2020/0244513 A1* | 7/2020 | Scharland | H04L 41/0672 | |
| 2020/0252319 A1* | 8/2020 | Specht | H04L 45/02 | |
| 2020/0326871 A1* | 10/2020 | Wu | G06F 3/0647 | |
| 2020/0358858 A1* | 11/2020 | Shribman | G06F 9/547 | |
| 2020/0389469 A1* | 12/2020 | Litichever | H04W 4/40 | |
| 2021/0034747 A1* | 2/2021 | Don | H04L 9/006 | |
| 2021/0036869 A1* | 2/2021 | Don | H04L 9/3263 | |
| 2021/0056121 A1* | 2/2021 | Jayanthi | G06F 16/27 | |
| 2021/0081105 A1* | 3/2021 | Crowley | G06F 9/4401 | |
| 2021/0263761 A1* | 8/2021 | Tsirkin | G06F 9/45558 | |
| 2022/0103525 A1* | 3/2022 | Shribman | G06F 16/955 | |
| 2022/0156155 A1* | 5/2022 | Timashev | G06F 16/148 | |
| 2022/0318199 A1* | 10/2022 | Bhagi | G06F 16/1794 | |

* cited by examiner

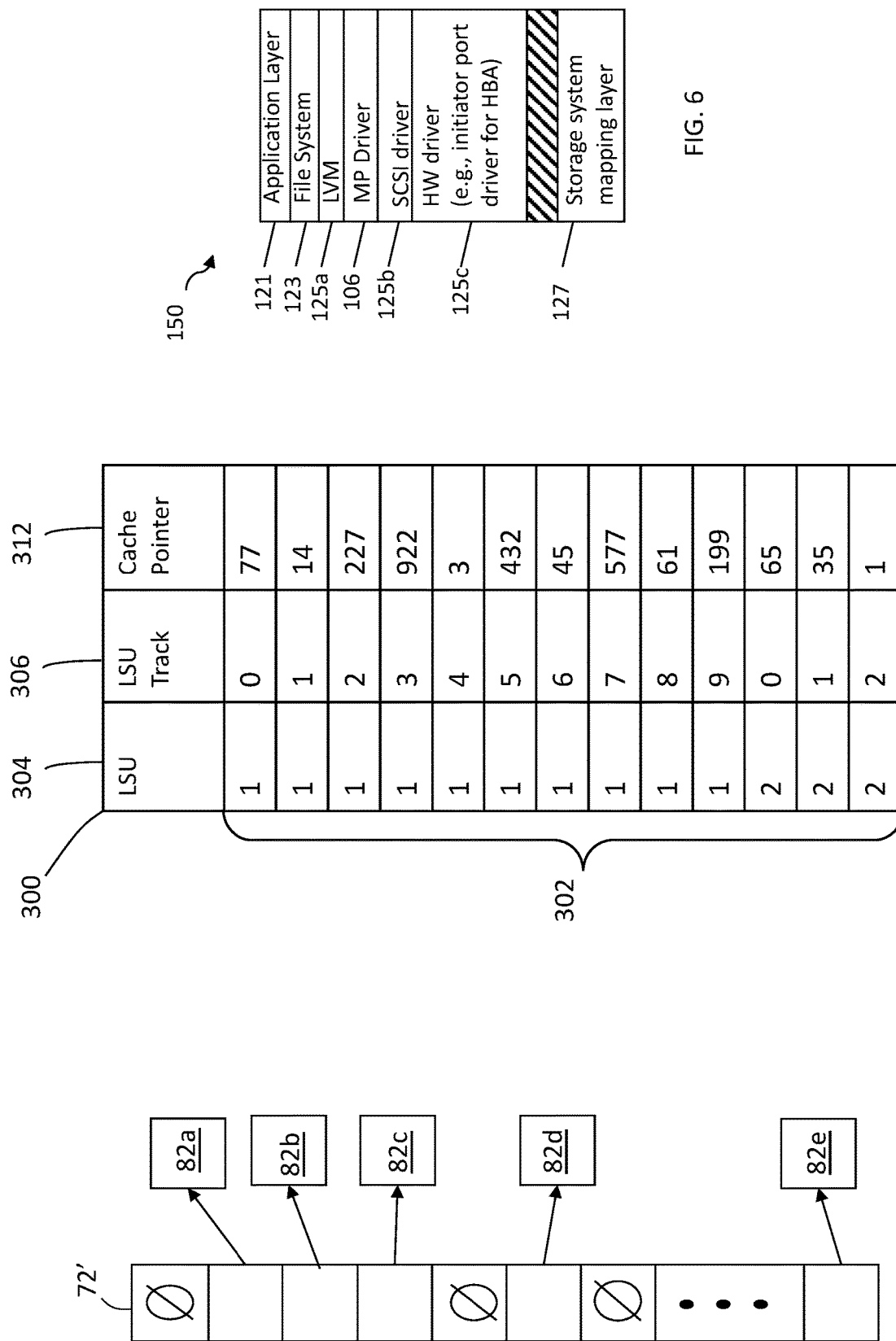

DATA MIGRATION BETWEEN STORAGE SYSTEMS

BACKGROUND

Technical Field

This application generally relates to data storage networks, and more particularly to migrating data between data storage systems.

Description of Related Art

Data storage systems (often referred to herein simply as "storage systems") may include storage resources used by one or more host systems (sometimes referred to herein as "hosts"), i.e., servers, to store data. One or more storage systems and one or more host systems may be interconnected by one or more network components, for example, as part of a switching fabric, to form a data storage network (often referred to herein simply as "storage network"). Storage systems may provide a variety of data services to host systems of the storage network.

A host system may have host applications that utilize the data services provided by one or more storage systems of the storage network to store data on the physical storage devices (e.g., tape, disks or solid state devices) thereof. For a given application, to perform input/output (I/O) operations utilizing a physical storage device of the storage system, one or more components of the host system, storage system and network components therebetween may be used. The one or more combinations of components of the host, switching fabric and storage system over which I/O operations between an application and storage device may be communicated may be considered an I/O path between the application and the storage device. It should be appreciated that other combinations of components of a storage network, for example, two or more storage systems, also may be coupled together by one or more switches of a switching fabric. Thus, more generically, the one or more combinations of components of a first network component, switching fabric and second network component over which I/O communications may be communicated may be considered an I/O path between the two network components. The collective I/O paths between components of a storage network may be considered to define a connectivity of the storage network.

Host systems may not address the physical storage devices of a storage systems directly, but rather access to data may be provided to one or more host systems from what the host system(s) view as a plurality of logical storage units (LSUs) including, for example, logical blocks, logical devices (also referred to as logical volumes, LUNs and logical disks), thin devices, groups of logical devices (e.g., storage groups), NVMe namespaces, and other types of LSUs. LSUs are described in more detail elsewhere herein.

SUMMARY OF THE INVENTION

In an embodiment of the invention, a method includes: at a first point in time: receiving a host system identifier identifying a host system, a source storage system identifier identifying a source storage system from which to migrate data and target storage system identifier identifying a target storage system to which to migrate data at a later time, and generating first migration source information indicative of a state of the host system and the storage system at the first point in time, including determining a plurality of logical storage units of the source storage system for data generated by a plurality of applications executing on the host system; and, at a second point in time after the first point in time and prior to the later time, and after the target storage system has been configured for migration based on the first source migration, information validating migration information, including: generating second migration source information indicative of a state of the host system and the source storage system at the second point in time, generating migration target information indicative of a state of the configured target system at the second point in time, and comparing the second migration source information and the migration target information. Generating the first migration source information may include: determining whether the host system is a member of a cluster of host systems serving at least a subset of the plurality of the applications to users; and, if it is determined that the host system is a member of a cluster, determining at least a subset of the plurality of logical storage units that are shared by the host systems of the cluster. Generating the first migration source information may include: determining whether the source storage system is replicated to a replica storage system; and, if the source storage system is replicated to a replica storage system, obtaining information about the replica storage system. The method further may include: generating target storage configuration commands for migrating the data from the source storage system to the target storage system; and displaying the target storage configuration commands to a user. The method of claim 1, further may include: receiving a migration report command from a user via a command line interface, wherein the migration report command includes one or more command parameters; and generating a migration report based on the migration report command. The first migration source information, the second migration source information and the migration target information may be generated using a scripting language that is agnostic to storage system type and host system type. The first host migration information may be generated in response to receiving a command via a command line interface, wherein the command specifies the host system identifier, the source storage system identifier and the target storage system identifier as command parameters.

In another embodiment of the invention, a system included executable logic that implements a method including: at a first point in time: receiving a host system identifier identifying a host system, a source storage system identifier identifying a source storage system from which to migrate data and target storage system identifier identifying a target storage system to which to migrate data at a later time, and generating first migration source information indicative of a state of the host system and the storage system at the first point in time, including determining a plurality of logical storage units of the source storage system for data generated by a plurality of applications executing on the host system; and, at a second point in time after the first point in time and prior to the later time, and after the target storage system has been configured for migration based on the first migration source information, validating migration information, including: generating second migration source information indicative of a state of the host system and the source storage system at the second point in time, generating migration target information indicative of a state of the configured target system at the second point in time, and comparing the second migration source information and the migration target information. Generating the first migration source information may include: determining whether the host system is a member of a cluster of host systems serving at least a subset of the plurality of the applications to users; and, if it is determined that the host system is a member of a cluster, determining at least a subset of the plurality of logical storage units that are shared by the host systems of the cluster. Generating the first migration source information may include: determining whether the source storage system is replicated to a replica storage system; and, if the source storage system is replicated to a replica storage system, obtaining information about the replica storage system. The method further may include: generating target storage configuration commands for migrating the data from the source storage system to the target storage system; and displaying the target storage configuration commands to a user. The method of claim 1, further may include: receiving a migration report command from a user via a command line interface, wherein the migration report command includes one or more command parameters; and generating a migration report based on the migration report command. The first migration source information, the second migration source information and the migration target information may be generated using a scripting language that is agnostic to storage system type and host system type. The first host migration information may be generated in response to receiving a command via a command line interface, wherein the command specifies the host system identifier, the source storage system identifier and the target storage system identifier as command parameters.

In another embodiment of the invention, computer-readable media has software stored thereon including: executable code that controls, at a first point in time: receiving a host system identifier identifying a host system, a source storage system identifier identifying a source storage system from which to migrate data and target storage system identifier identifying a target storage system to which to migrate data at a later time, and generating first migration source information indicative of a state of the host system and the storage system at the first point in time, including determining a plurality of logical storage units of the source storage system for data generated by a plurality of applications executing on the host system; and executable code that controls, at a second point in time after the first point in time and prior to the later time, and after the target storage system has been configured for migration based on the first source migration, information validating migration information, including: generating second migration source information indicative of a state of the host system and the source storage system at the second point in time, generating migration target information indicative of a state of the configured target system at the second point in time, and comparing the second migration source information and the migration target information. Generating the first migration source information may include: determining whether the host system is a member of a cluster of host systems serving at least a subset of the plurality of the applications to users; and, if it is determined that the host system is a member of a cluster, determining at least a subset of the plurality of logical storage units that are shared by the host systems of the cluster. Generating the first migration source information may include: determining whether the source storage system is replicated to a replica storage system; and, if the source storage system is replicated to a replica storage system, obtaining information about the replica storage system. The software further may include: executable code that controls generating target storage configuration commands for migrating the data from the source storage system to the target storage system; and executable code that controls displaying the target storage configuration commands to a user. The software further may include: executable code that controls receiving a migration report command from a user via a command line interface, wherein the migration report command includes one or more command parameters; and executable code that controls generating a migration report based on the migration report command. The first migration source information, the second migration source information and the migration target information may be generated using a scripting language that is agnostic to storage system type and host system type.

BRIEF DESCRIPTION OF THE DRAWINGS

Features and advantages of the present invention will become more apparent from the following detailed description of illustrative embodiments thereof taken in conjunction with the accompanying drawings in which:

FIG. 3B a block diagram illustrating an example of a table used for a thin logical device, according to embodiments of the invention;

FIG. 4 is a block diagram illustrating an example of a data structure for mapping logical storage unit tracks to cache slots, according to embodiments of the invention;

FIG. 6 is a block diagram illustrating an example of a plurality of logical layers of a combination of a host system and a data storage system for processing an I/O request, according to embodiments of the invention;

DETAILED DESCRIPTION OF EMBODIMENTS

Figure 1:
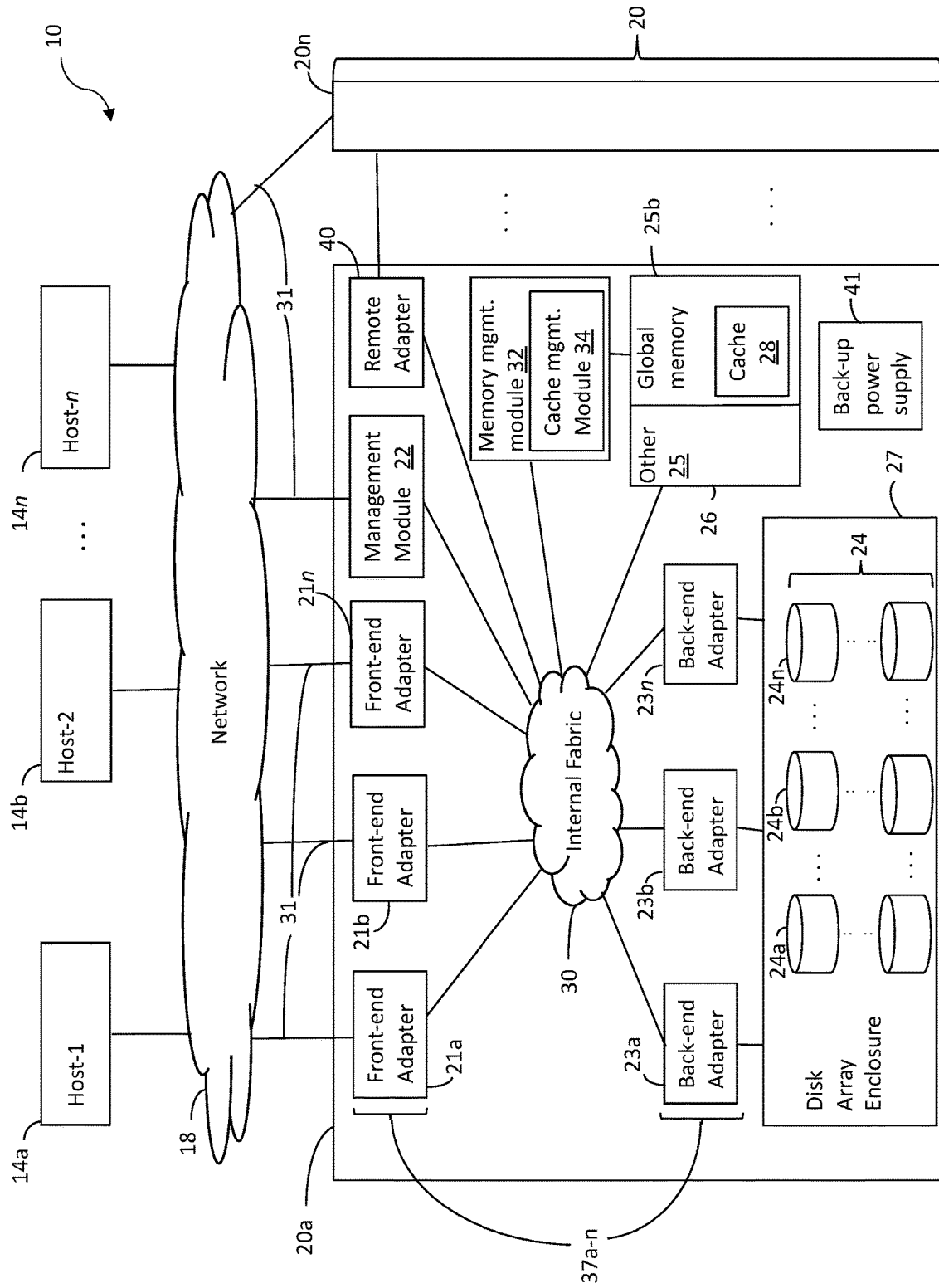
FIG. 1 is a block diagram illustrating an example of a data storage network, according to embodiments of the invention.

Data migration is a data service that may be performed on a storage network, in which data stored on a first storage system, which may be referred to as a "source storage system" or "source system" is moved to a second storage system, which may be referred to as a "target storage system" or "target system." Data migration may involve initially setting up (i.e., configuring) the migration, including configuring the target system for the migration. While it may be desirable to perform such configuration in an automated fashion, it may not be possible to do so. For example, a migration tool for automating aspects of the migration may be configured for a particular computer environment or platform (e.g., a Windows-based platform) that is different than the environment or platform of a customer (e.g., an owner or custodian of the storage systems involved or the data stored thereon) for whom the migration is being performed. Moreover, such a tool may require installation on a customer site, and the customer may not be willing to allow such installation, e.g., for security reasons. Performing migration manually may be time-consuming, tedious and prone to human error, especially for more complex storage system environments.

Aside from being specific to a computer platform/environment, an automated tool may be relatively inflexible, requiring that a source system and resulting target system be configured in a certain way in order to perform migration. That is, it may be necessary to modify the current configuration of the source storage system to conform to the automated tool before migration may be performed on it.

The data migration may be configured several days or even weeks before the migration is scheduled to be performed, to allow for preparation and coordination between the various stakeholders in the migration. For example, it may be desirable to schedule the migration at a time when the storage system and/or host is not busy (e.g., on a weekend) and/or at the end of a fiscal quarter or the like. During the time between the coordination of the migration and the performance of the migration, information pertinent to the migration may have changed. For example, one or more LSUs (e.g., LUNs) may have been added or decommissioned since the migration was configured. What's more, the information may have changed without knowledge of the person(s) responsible for the migration. In addition, a last-minute request for a change to the source configuration or target configuration may be made. Such changes and last-minute requests may consume additional human resources for migrations being done manually and/or using an inflexible tool, including making modifications to the source or target storage systems and re-configuring the migration itself. Furthermore, the migration may need to be delayed because of such changes and/or requests. If there is a need to schedule a migration in advance as described above, such delay may be days, weeks or even more.

What is desirable is a more flexible, platform-independent migration tool that does not require installation on a customer site to be executed.

Described herein are techniques and mechanisms for migrating data in a flexible and platform-independent manner that does not require installation on a customer site to be executed. In some embodiments, a software tool may be written in a scripting language, for example, Perl, Python, Ruby, and a Unix Shell or variant thereof (to name a few), which may be interpreted at run-time as opposed to requiring compilation beforehand. The tool may include multiple modules, where each module may be configured to perform one or more specific functions in accordance with the invention, and each module may be capable of receiving and outputting data in a flat-file format, for example, with comma-delimited values. The software tool may present a command-line interface (CLI) that enables a user to specify execution of one or more actions by entering commands on a command line.

Use of a CLI and a scripting language may be preferred over use of a GUI and its underlying programming language for a variety of reasons, including, for example: to avoid the need to click through controls to access information; ease of modification of information displayed and format thereof; ease of programming (scripts generally require less expertise and programming time); no compilation required after modification to code; and ability to execute on multiple platforms and in multiple environments.

One or more commands may result in display of information related to a data migration that has been performed or has been configured (or is the process of being configured) but not performed yet. Some or all of the information to be displayed to the user and/or the format of such information may be configured using command parameters entered along with a command via a command line without knowledge of the platform of the host system, the source storage system and/or the target storage system. Thus, the information to be displayed and the format of the information may be relatively easily altered by a user without the need to alter and recompile source code.

It should be appreciated that while embodiments of the invention are described in relation to a software tool, the invention is not so limited, as one or more aspects of the invention, including components of the software tool described herein, may be implemented in hardware, at least in part.

In some embodiments, migration source information reflecting the state of at least a first host system and source storage system may be generated, for example, in response to a host system ID and source storage system ID being specified via a CLI, e.g., along with a target system ID. The migration source information may be displayed in an intuitive manner, the content and format of which may be modified by a user using command line parameters. The migration source information may specify one or more LSUs of the source storage system for data generated by a plurality of applications executing on the host system, and the size and number such LSUs. The migration source information also may specify one or more host ports providing connectivity to the one or more LSUs, and the login status of such ports. Any of such information may be displayed to the user and stored, for example, in one or more flat files.

In some embodiments, generating the migration source information for a specified host system and storage system may include determining whether the host system is part of a host cluster serving one or more applications to a user, and if so, which LSUs of the storage system are shared between the specified host system and the other host systems of the host cluster, and the size and number such LSUs. Any of such information may be displayed to the user and stored, for example, in one or more flat files.

In some embodiments, generating the migration source information for a specified host system and storage system may include determining whether any LSUs of the source storage system to be migrated are replicated to replica LSUs on a replica storage system, and if so, may obtain and display information about the replica storage system and replica LSUs, and may store such information in one or more flat files.

The migration source information may reveal information to a user (e.g., system administrator) not previously realized by the user, and prompt the user to make changes to the host system and/or source storage system, after which the migration source information may be re-generated.

In some embodiments, target storage configuration commands for migrating the data from the source storage system to the target storage system may be generated, for example, based on the migration source information. The target storage configuration commands may be generated in response to a CLI command received from the user, and may be displayed to a user, providing the user an opportunity to validate the target configuration. The target storage configuration commands may be stored in one or more flat files. In some embodiments, the user, or another user with proper authorization may edit the target storage configuration commands, for example, by editing one or more flat files that contains them. The target system may be configured for migration of the data by executing the target storage configuration commands, for example, after the target storage configuration commands have been validated, and perhaps modified.

In some embodiments, after the target system has been configured for migration, but prior to migrating the data (i.e., prior to performing the migration), migration information for performing the migration may be validated, for example, in response to a CLI command entered by a user. Such validation may include generating second migration source information indicative of a state of the host system and the source storage system at a point in time later than the point in time at which the migration source information was first generated, for example, close to the time at which the migration is scheduled to be performed. Such validation also may include generating migration target information indicative of a state of the configured target system at the point in time, and comparing the second migration source information and the migration target information. For example, such validation may include comparing LSU information (e.g., the number of LSUs, types of LSUs and sizes of LSUs), including shared LUN information (e.g., number, size), replica information (e.g., the number of replicated LSUs, replica storage system information, host system information, for example, port IDs (e.g., WWNs) of the host systems ports corresponding to the LSUs; other information; or any suitable combination of the foregoing. Any discrepancies may be reported to the user, for example, as part of validation information displayed to the user.

Validation information (e.g., any of the information described above) may be displayed to a user, including displaying any discrepancies between source storage system information and target storage system information. The user may make modify the configuration of the source storage system, target storage system and/or host system based on the validation information, in response to which: new target storage configuration commands may be generated, the target storage system may be reconfigured, and migration information validated again. It should be appreciated that the migration information may be verified (and changes made and reconfigurations performed) multiple times between an initial generation of migration source information and performance of the migration. Any information generated as part of the validation process may be stored, for example, in one or more flat files.

After performance of the migration, one or more migration reports may be generated, for example, in response to a CLI command entered by the user. The information displayed in a report, and the manner in which it is displayed, may be controlled by a user using CLI command parameters.

Illustrative embodiments of the invention will now be described in more detail in relation to the figures.

FIG. 1 illustrates an example of an embodiment of a data storage network 10 (often referred to herein as a "storage network"). The storage network 10 may include any of: host systems (i.e., "hosts") 14a-n; network 18; one or more storage systems 20a-n; other components; or any suitable combination of the foregoing. Storage systems 20a-n, connected to host systems 14a-n through network 18, may collectively constitute a distributed storage system 20. All of the host computers 14a-n and storage systems 20a-n may be located at the same physical site, or, alternatively, two or more host computers 14a-n and/or storage systems 20a-n may be located at different physical locations. Storage network 10 or portions thereof (e.g., one or more storage systems 20a-n in combination with network 18) may be any of a variety of types of storage networks, such as, for example, a storage area network (SAN), e.g., of a data center. Embodiments of the invention are described herein in reference to storage system 20a, but it should be appreciated that such embodiments may be implemented using other discrete storage systems (e.g., storage system 20n), alone or in combination with storage system 20a.

The N hosts 14a-n may access the storage system 20a, for example, in performing input/output (I/O) operations or data requests, through network 18. For example, each of hosts 14a-n may include one or more host bus adapters (HBAs) (not shown) that each include one or more host ports for connecting to network 18. The network 18 may include any one or more of a variety of communication media, switches and other components known to those skilled in the art, including, for example: a repeater, a multiplexer or even a satellite. Each communication medium may be any of a variety of communication media including, but not limited to: a bus, an optical fiber, a wire and/or other type of data link, known in the art. The network 18 may include at least a portion of the Internet, or a proprietary intranet, and components of the network 18 or components connected thereto may be configured to communicate in accordance with any of a plurality of technologies, including, for example: SCSI, ESCON, Fibre Channel (FC), iSCSI, FCoE, GIGE (Gigabit Ethernet), NVMe over Fabric (NVMeoF); other technologies, or any suitable combinations of the foregoing, each of which may have one or more associated standard specifications. In some embodiments, the network 18 may be, or include, a switching fabric including one or more switches and other components. A network located externally to a storage system that connects host systems to storage system resources of the storage system, may be referred to herein as an "external network."

Each of the host systems 14a-n and the storage systems 20a-n included in the storage network 10 may be connected to the network 18 by any one of a variety of connections as may be provided and supported in accordance with the type of network 18. The processors included in the host computer systems 14a-n may be any one of a variety of proprietary or commercially available single or multi-processor system, such as an Intel-based processor, or other type of commercially available processor able to support traffic in accordance with each particular embodiment and application. Each of the host computer systems may perform different types of I/O operations in accordance with different tasks and applications executing on the hosts. In the embodiment of FIG. 1, any one of the host computers 14a-n may issue an I/O request to the storage system 20a to perform an I/O operation. For example, an application executing on one of the host computers 14a-n may perform a read or write operation resulting in one or more I/O requests being transmitted to the storage system 20a.

Each of the storage systems 20a-n may be manufactured by different vendors and inter-connected (not shown). Additionally, the storage systems 20a-n also may be connected to the host systems through any one or more communication connections 31 that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by each of the host computer systems 14a-n, for example, to the storage systems 20a-20n. It should be appreciated that the particulars of the hardware and software included in each of the components that may be included in the storage systems 20a-n are described herein in more detail, and may vary with each particular embodiment.

Each of the storage systems, such as 20a, may include a plurality of physical storage devices 24 (e.g., physical non-volatile storage devices) such as, for example, disk devices, solid-state storage devices (SSDs, e.g., flash, storage class memory (SCM), NVMe SSD, NVMe SCM) or even magnetic tape, and may be enclosed within a disk array enclosure (DAE) 27. In some embodiments, two or more of the physical storage devices 24 may be grouped or arranged together, for example, in an arrangement consisting of N rows of physical storage devices 24a-n. In some embodiments, one or more physical storage devices (e.g., one of the rows 24a-n of physical storage devices) may be connected to a back-end adapter ("BE") (e.g., a director configured to serve as a BE) responsible for the backend management of operations to and from a portion of the physical storage devices 24. A BE is sometimes referred to by those in the art as a disk adapter ("DA") because of the development of such adapters during a period in which disks were the dominant type of physical storage device used in storage systems, even though such so-called DAs may be configured to manage other types of physical storage devices (e.g., SSDs). In the system 20a, a single BE, such as 23a, may be responsible for the management of one or more (e.g., a row) of physical storage devices, such as row 24a. That is, in some configurations, all I/O communications with one or more physical storage devices 24 may be controlled by a specific BE. BEs 23a-n may employ one or more technologies in communicating with, and transferring data to/from, physical storage devices 24, for example, SAS, SATA or NVMe. For NVMe, to enable communication between each BE and the physical storage devices that it controls, the storage system may include a PCIe switch for each physical storage device controlled by the BE; i.e., connecting the physical storage device to the controlling BE.

It should be appreciated that the physical storage devices are not limited to being arranged in rows. Further, the DAE 27 is not limited to enclosing disks, as the name may suggest, but may be constructed and arranged to enclose a plurality of any type of physical storage device, including any of those described herein, or combinations thereof.

The system 20a also may include one or more front-end adapters ("FAs") 21a-n (e.g., directors configured to serve as FAs), which also are referred to herein as host adapters ("Hs"). Each of these FAs may be used to manage communications and data operations between one or more host systems and global memory (GM) 25b of memory 26. The FA may be, or include, a Fibre Channel (FC) adapter if FC is a technology being used to communicate between the storage system 20a and the one or more host systems 14a-n, or may be another type of adapter based on the one or more technologies being used for I/O communications.

Also shown in the storage system 20a is a remote adapter ("RA") 40. The RA may be, or include, hardware that includes a processor used to facilitate communication between storage systems (e.g., 20a and 20n), such as between two of the same or different types of storage systems, and/or may be implemented using a director.

Storage system 20a also may include a management module 22, which may be configured (e.g., dedicated) to performing storage management functions or services such as, for example, storage provisioning, device configuration, tier management, other services, or any combination of other services. The management module 22 also may be configured to perform, or assist in performing analysis such as, for example, performance and/or utilization analysis and/or forecasting of system behavior, the result of which may inform other management functions performed by the management module 22. The management module may be configured to be accessed by only certain personnel (e.g., storage administrators, support engineers) and may have its own dedicated hardware, firmware, software, CPU resources and OS, and may be loaded with one or more applications, tools, CLIs, APIs and the like to enable management. In some embodiments, the management module, or portions thereof, may be located external to storage system 20a, for example, as part of one of host systems 14a-n or another separate system connected to storage system 20a via network 18.

The FAs, BEs and RA may be collectively referred to herein as directors 37a-n. Each director 37a-n may be implemented (e.g., in hardware, firmware, software or a combination thereof) on a circuit board that includes memory resources (e.g., at least a segment of GM portion 25b) and compute resources, for example, one or more processing cores (e.g., as part of a CPU) and/or a CPU complex for processing I/O operations, and that as described in more detail elsewhere herein. There may be any number of directors 37a-n, which may be limited based on any of a number of factors, including spatial, computation and storage limitations. In an embodiment disclosed herein, there may be up to sixteen directors coupled to the memory 26. Other embodiments may use a higher or lower maximum number of directors.

System 20a also may include an internal switching fabric (i.e., internal fabric) 30, which may include one or more switches, that enables internal communications between components of the storage system 20a, for example, directors 37a-n (FAs 21a-n, BEs 23a-n, RA 40, management module 22) and memory 26, e.g., to perform I/O operations. One or more internal logical communication paths may exist between the directors and the memory 26, for example, over the internal fabric 30. For example, any of the directors 37a-n may use the internal fabric 30 to communicate with other directors to access any of physical storage devices 24; i.e., without having to use memory 26. In addition, one of the directors 37a-n may be able to broadcast a message to all of the other directors 37a-n over the internal fabric 30 at the same time. Each of the components of system 20a may be configured to communicate over internal fabric 30 in accordance with one or more technologies such as, for example, InfiniBand (TB), Ethernet, Gen-Z, another technology, or any suitable combination of the foregoing.

The GM portion 25b may be used to facilitate data transfers and other communications between the directors 37a-n in a storage system. In one embodiment, the directors 37a-n (e.g., serving as FAs or BEs) may perform data operations using a cache 28 that may be included in the GM 25b, for example, in communications with other directors, and other components of the system 20a. The other portion 25a is that portion of memory that may be used in connection with other designations that may vary in accordance with each embodiment. Global memory 25b and cache 28 are described in more detail elsewhere herein. It should be appreciated that, although memory 26 is illustrated in FIG. 1 as being a single, discrete component of storage system 20a, the invention is not so limited. In some embodiments, memory 26, or the GM 25b or other memory 25a thereof, may be distributed among a plurality of physically discrete processing nodes (e.g., circuit boards) as described in more detail elsewhere herein.

In at least one embodiment, write data received at the storage system from a host or other client may be initially written to cache 28 and marked as write pending. For example, cache 28 may be partitioned into one or more portions called cache slots (which also may be referred to in the field of data storage as cache lines, cache blocks or another name), which may be a of a predefined uniform size, for example, 128 Kbytes. Write data of a write operation received at the storage system may be initially written (i.e., staged) in one or more of these cache slots and marked as write pending. Once written to cache 28, the host (e.g., one of 14a-n) may be notified that the write operation has completed. At a later time, the write data may be de-staged from cache 28 to one or more physical storage devices 24a-n, such as by a BE.

The memory 26 may include persistent memory for which for which data stored thereon persists after the process or program that created the data terminates. For example, at least portions of the memory 26 may be implemented using one or more dual in-line memory modules (DIMMs) or another type of fast RAM memory, which may be battery-backed by a NAND-type memory (e.g., flash). In some embodiments, the data in such persistent memory may persist (for at least some period of time) after the storage system fails. The memory 26 (or at least a portion thereof—e.g., the cache 28 or a portion thereof) may be configured such that each data written to the memory 28 is mirrored to provide a form of write protection. For example, each memory location within each such mirrored portion of the memory 26 may have a corresponding memory location on the storage system 20a to which a redundant copy of the data is stored, and which can be used in place of the mirrored memory location in the event the mirrored memory location fails. The redundant memory location should be located outside of at least the most local fault zone of the mirrored memory location. In some embodiments described in more detail herein, the memory 26 may be distributed among multiple physically discrete processing nodes (e.g., circuit boards), in which case mirroring may be configured such that a mirrored memory location and its corresponding redundant memory location are located on different physically discrete processing nodes.

Storage system 20a may include a back-up power supply 41 (e.g., a battery) that can provide power to the storage system for a limited amount of time to after primary (AC) power fails. This limited time may allow certain tasks to be performed during a window of time beginning when the primary power fails until the earliest of: the primary power is restored; and the end of the limited lifetime (sometimes on the order of second or tens of seconds) of the back-up power supply. For example, the storage system 20a (e.g., the memory 26 and/or memory management module 32) may be configured to automatically copy the contents of the memory 26 during this window of time to one or more predetermined physical storage devices, to be restored to the memory 26 after the power has been restored, e.g., as part of the storage system recovering process. Such automatic copying for restoration during recovering may referred to herein as "vaulting." Vaulting may provide a form of write protection for data written to the memory 26, for example, for dirty data in the cache 28; i.e., data written to the storage system, which has been staged in the cache 28 but not yet de-staged to a physical storage device. More broadly, vaulting may be performed for any data written to the memory 26.

The storage system 20a may include a memory management module 32 configured to manage one or more aspects of the memory 26, and the memory management module 32 may include a cache management module 34 for managing one or more aspects of the cache 28.

It should be noted that, although examples of techniques herein may be made with respect to a physical storage system and its physical components (e.g., physical hardware for each RA, BE, FA and the like), techniques herein may be performed in a physical storage system including one or more emulated or virtualized components (e.g., emulated or virtualized ports, emulated or virtualized BEs or FAs), and also a virtualized or emulated storage system including virtualized or emulated components. For example, in embodiments in which NVMe technology is used to communicate with, and transfer data between, a host system and one or more FAs, one or more of the FAs may be implemented using NVMe technology as an emulation of an FC adapter.

Figure 2:
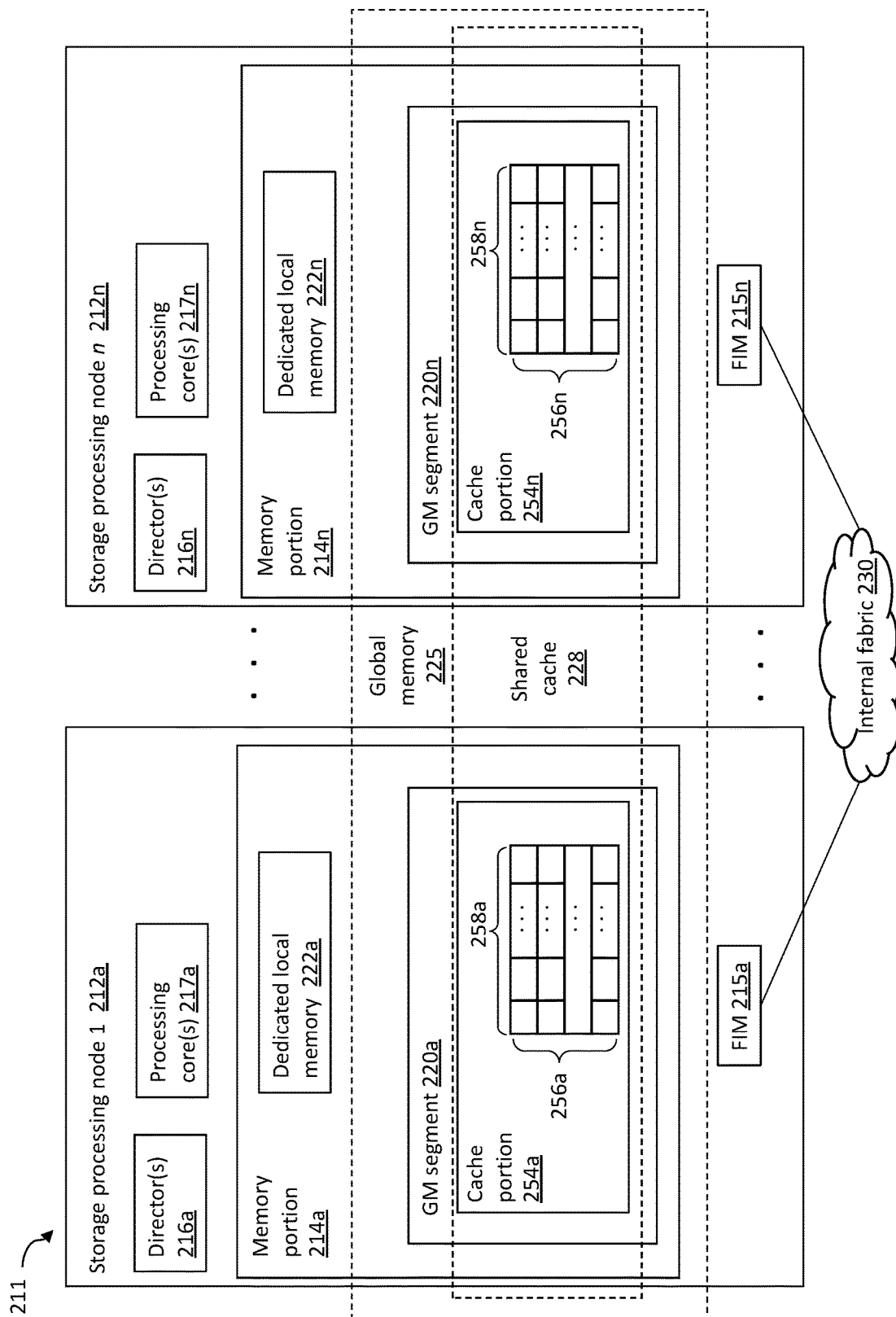
FIG. 2 is a block diagram illustrating an example of a storage system including multiple physically discrete storage processing nodes, according to embodiments of the invention.

Any of storage systems 20a-n, or one or more components thereof, described in relation to FIGS. 1-2 may be implemented using one or more Symmetrix™, VMAX™, VMAX3™ or PowerMax™ systems made available from Dell EMC.

Host systems 14a-n may provide data and control (e.g., management and access control) information to storage systems 20a-n over a plurality of I/O paths defined between the host systems and storage systems, for example, including host system components, storage system components, and network components (e.g., of network 18), and the storage systems also may provide data to the host systems across the I/O paths. In the embodiment of FIG. 1, the host systems may not address the physical storage devices (e.g., disk drives or flash drives) 24 of the storage systems directly, but rather access to data may be provided to one or more host systems from what the host systems view as a plurality of LSUs including, for example, logical blocks, logical devices (also referred to as logical volumes, LUNs, logical storage units and/or logical disks), thin devices, groups of logical devices (e.g., storage groups), NVMe namespaces, and other types of LSUs. For example, a PowerMax storage system may be configured to organize available storage resources (e.g., physical storage devices) into many LUNs, each with its own addressable space defined in logical blocks addresses (LBAs). The LSUs may or may not correspond to the actual physical storage devices. For example, one or more LSUs may map to a single physical storage device; that is, the logical address space of the one or more LSU may map to physical space on a single physical storage device. Data in a single storage system may be accessed by multiple hosts allowing the hosts to share the data residing therein. The FAs may be used in connection with communications between a storage system and a host system. The RAs may be used in facilitating communications between two storage systems. The BEs may be used in connection with facilitating communications to the associated physical storage device(s) based on LSU(s) mapped thereto.

FIG. 2 is a block diagram illustrating an example of at least a portion 211 of a storage system (e.g., 20a) including multiple, physically discrete storage processing nodes (e.g., circuit boards) 212a-212n, which may be referred to herein as "processing nodes." Storage system 211 may include a plurality of processing nodes 212a-212n and a fabric 230 (e.g., internal fabric 30) over which the processing nodes 212a-n may communicate. Each of the processing nodes 212a-212n may include components thereon as illustrated. The switching fabric 230 may include, for example, one or more switches and connections between the switch(es) and processing nodes 212a-212n. In at least one embodiment, the fabric 230 may be an IB fabric. In some embodiments, multiple processing 212a-n nodes may be implemented on a single physically discrete component; e.g., two processing nodes 212a-n may be implemented on single engine of PowerMax storage system.

In the following paragraphs, further details are described with reference to processing node 212a but each of the N processing nodes in a system may be similarly configured. For example, processing node 212a may include any of: one or more directors 216a (e.g., directors 37a-n); memory portion 214a; one or more processing cores 217a including compute resources, for example, as part of a CPUs and/or a CPU complex for processing I/O operations; and a fabric interface module (FIM) 215a for interfacing the processing node 212a to an internal fabric 230. Each director 216a may be configured to operate, such as by executing code, as any one or more of an FA, BE, RA, and the like. In some embodiments, each of the directors, or a portion thereof, are implemented in software stored in a memory portion 214a (e.g., in a dedicated local memory 222a) that is executed by one or more of the processing cores 217a. Such software implementation of directors may be considered emulations of types of physical directors (i.e., directors implemented (at least primarily) in hardware).

Each FIM 215a-n may include one or more host channel adapters (HCAs) that physically couple, and are configured to enable communication between, its respective processing node 212a-n, and the internal fabric 230. In some embodiments, the internal fabric 230 may include multiple (e.g., 2) switches, and each HCA 215a-n may have multiple (e.g., 2) ports, each one connected directly to one of the switches.

Each of the processing nodes 212a-n may, respectively, also include memory portions 214a-n. The memory portion of each processing node may be characterized as locally accessible with respect to that particular processing node, and more specifically with respect to other components on the same processing node. For example, processing node 212a includes memory portion 214a which is memory that is local to that particular processing node 212a. Data stored in memory portion 214a may be directly accessed by any of the processing cores 217a (e.g., executing instructions on behalf of one of the directors 216a) of the processing node 212a. For example, memory portion 214a may be a fast memory (e.g., DIMM DRAM (dynamic random access memory)) that is locally accessible by a director 216a, where data from one location in 214a may be copied to another location in 214a directly using DMA operations (e.g., local memory copy operations) issued by director 216a. Thus, the director 216a may directly access data of 214a locally without communicating over the fabric 230.

The memory portions 214a-214n of processing nodes 212a-n may be further partitioned into different portions or segments for different uses. For example, each of the memory portions 214a-214n may respectively include GM segments 220a-n configured for collective use as segments of a distributed GM, for example, GM 225 (e.g., GM 25b). Thus, data stored in any GM segment 220a-n may be accessed by any director 216a-n on any processing node 212a-n. Additionally, each of the memory portions 214a-n may respectively include dedicated local memories 222a-n. Each of the dedicated local memories 222a-n are respectively configured for use locally by the one or more directors 216a-n, and possibly other components, residing on the same single processing node. In at least one embodiment where there is a single director denoted by 216a (and generally by each of 216a-n), data stored in the dedicated local memory 222a may be accessed by the respective single director 216a located on the same processing node 212a. However, the remaining directors located on other ones of the N processing nodes may not access data stored in the dedicated local memory 222a.

To further illustrate, GM segment 220a may include information such as user data stored in the cache portion 220a, metadata, and the like, that is accessed (e.g., for read and/or write) generally by any director of any of the processing nodes 212a-n. Thus, for example, any director 216a-n of any of the processing nodes 212a-n may communicate over the fabric 230 to access data in GM segment 220a. In a similar manner, any director 216a-n of any of the processing nodes 212a-n may generally communicate over fabric 230 to access any GM segment 220a-n of the distributed GM. Although a particular GM segment, such as 220a, may be locally accessible to directors on one particular processing node, such as 212a, any director of any of the processing nodes 212a-n may generally access the GM segment 220a. Additionally, the director 216a also may use the fabric 230 for data transfers to and/or from GM segment 220a even though 220a is locally accessible to director 216a (without having to use the fabric 230).

Also, to further illustrate, dedicated local memory 222a may be a segment of the memory portion 214a on processing node 212a configured for local use solely by components on the single/same processing node 212a. For example, dedicated local memory 222a may include data described in following paragraphs which is used and accessed only by directors 216a included on the same processing node 212a as the dedicated local memory 222a. In at least one embodiment in accordance with techniques herein and as described elsewhere herein, each of the dedicated local memories 222a-n may include a local page table or page directory used, respectively, by only director(s) 216a-n local to each of the processing nodes 212a-n.

In such an embodiment as in FIG. 2, the GM segments 220a-n may be logically concatenated or viewed in the aggregate as forming one contiguous GM logical address space of a distributed GM. In at least one embodiment, the distributed GM formed by GM segments 220a-n may include the cache portion 254a, various metadata and/or structures, and other information, as described in more detail elsewhere herein. Consistent with discussion herein, the cache portion 254a, having cache slots allocated from GM segments 220a-n, may be used to store I/O data (e.g., for servicing read and write operations).

Each cache portion 254a-n may be a portion of a shared cache 228 (e.g., cache 28) distributed across the processing nodes 212a-n, where the shared cache 228 may be considered a part of the GM 225. The cache portion 254a-n may include a plurality of cache slots 256a-n, each cache slot including one or more (e.g., 16) sections 258a-n. Each cache slot 256a-n may be of a uniform size (e.g., 128 KB) and each section may be of a uniform size (e.g., 8 KB). It should be appreciated that cache slot sizes and section sizes other than 128 KB and 8 KB, and a quantity of sections other than 16, may be used.

In an embodiment, the storage system as described may be characterized as having one or more logical mapping layers in which an LSU of the storage system is exposed to the host whereby the LSU is mapped by such mapping layers of the storage system to one or more physical storage devices. Additionally, the host also may have one or more additional mapping layers so that, for example, a host-side LSU may be mapped to one or more storage system LSUs as presented to the host.

Any of a variety of data structures may be used to process I/O on storage system 20a, including data structures to manage the mapping of LSUs and locations thereon to physical storage devices and locations thereon. Such data structures may be stored in any of memory 26, including GM 25b and memory 25a, GM segment 220a-n and/or dedicated local memories 22a-n. Thus, storage system 20a, and storage system 620a described in more detail elsewhere herein, may include memory elements (e.g., cache) that hold data stored on physical storage devices or that is currently held ("staged") and will be stored ("de-staged") to physical storage devices, and memory elements that store metadata (e.g., any of the metadata described herein) associated with such data. Illustrative examples of data structures for holding such metadata will now be described.

Figure 3A:
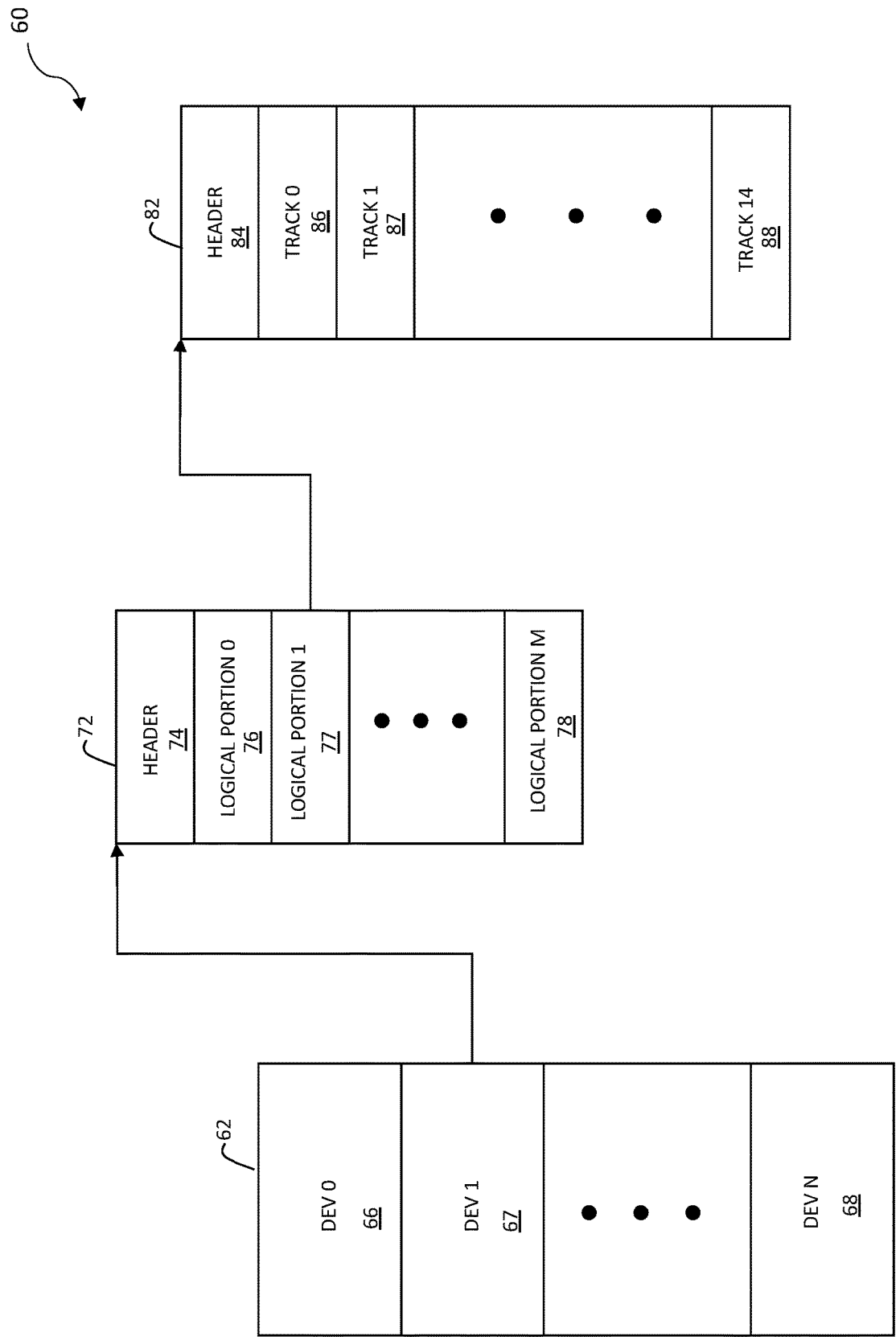
FIG. 3A is a block diagram illustrating an example of tables defining relationships between logical storage units and physical storage devices on a data storage system, according to embodiments of the invention.

FIG. 3A is a block diagram illustrating an example of tables 60 defining relationships between LSUs and physical storage devices on a data storage system, according to embodiments of the invention. A first table 62 corresponds to the LSUs (e.g., logical deices) used by a storage system (e.g., storage system 20a) or by an element of a storage system, such as an FA and/or a BE, and may be referred to herein as a "master LSU table." The master LSU table 62 may include a plurality of LSU entries 66-68, each entry representing an LSU used by the storage system. The entries in the master LSU table 62 may include descriptions for any type of LSU described herein.

Each of the entries 66-68 of the master LSU table 62 may correspond to, and include a reference to, another table corresponding to the LSU represented by the respective entry. For example, the entry 67 may reference a table 72, referred to herein as an "LSU table," corresponding to the LSU represented by the entry 67. The LSU table 72 may include a header that contains information pertinent to the LSU as a whole. The LSU table 72 also may include entries 76-78 for separate contiguous logical data portions of the represented LSU; each such logical data portion corresponding to, and including a reference to, one or more contiguous physical locations (e.g., logical block address ranges) of a physical storage device (e.g., a cylinder and/or a group of tracks). In an embodiment disclosed herein, an LSU may contain any number of logical data portions depending upon how the LSU is initialized. However, in other embodiments, an LSU may contain a fixed number of logical data portions.

Each of the logical data portion entries 76-78 may correspond to a track table. For example, the entry 77 may correspond to a track table (or "LSU track table") 82, which includes a header 84. The LSU track table 82 also includes entries 86-88, each entry representing an LSU track of the entry 77. As used herein, a "track" or "LSU track" represents a contiguous segment of physical storage space on a physical storage device. In an embodiment disclosed herein, there are fifteen tracks for each contiguous logical data portion. However, for other embodiments, it may be possible to have different numbers of tracks for each of the logical data portions or even a variable number of tracks for each logical data portion. The information in each of the LSU track entries 86-88 may include a pointer (either direct or indirect—e.g., through another data structure) to a physical address of a physical storage device, for example, any of physical storage devices 24 of the storage system 20a (or a remote storage system if the system is so configured).

In addition to physical storage device addresses, or as an alternative thereto, each of the LSU track entries 86-88 may include a pointer (either direct or indirect—e.g., through another data structure) to one or more cache slots of a cache in the GM if the data of the logical track is currently in cache. For example, an LSU track entry 86-88 may point to one or more entries of cache slot table 300, described in more detail elsewhere herein. Thus, the LSU track table 82 may be used to map logical addresses of an LSU corresponding to the tables 62, 72, 82 to physical addresses within physical storage devices of a storage system and/or to cache slots within a cache.

In some embodiments, each entry 86-88 may specify a version of the data stored on the track, as described in more detail elsewhere herein. A sub-element of an LSU, for example, a logical storage portion or track, may be referred to herein as a logical storage element (LSE).

FIG. 3B is a diagram illustrating an example of a table 72' used for a thin logical device (i.e., a thin LSU), which may include null pointers as well as entries similar to entries for the LSU table 72, discussed above, that point to a plurality of LSU track tables 82a-82e. Table 72' may be referred to herein as a "thin device table." A thin logical device may be allocated by the system to show a particular storage capacity while having a smaller amount of physical storage that is actually allocated. When a thin logical device is initialized, all (or at least most) of the entries in the thin device table 72' may be set to null. Physical data may be allocated for particular sections as data is written to the particular logical data portion. If no data is written to a logical data portion, the corresponding entry in the thin device table 72' for the data portion maintains the null pointer that was written at initialization.

FIG. 4 is a block diagram illustrating an example of a data structure 300 for mapping LSU tracks (e.g., thin device tracks) to cache slots of a cache. Data structure 300 may be referred to herein as a "cache slot table." Cache slot table 300 may include a plurality of entries (i.e., rows) 302, each row representing an LSU track (e.g., any of LSU tracks 86-88 in track table 82) identified by an LSU ID in column 304 and an LSU track ID (e.g., number) identified in column 306. For each entry of cache slot table 300, column 312 may specify a cache location in a cache corresponding to the logical storage device track specified by columns 304 and 306. A combination of an LSU identifier and LSU track identifier may be used to determine from columns 304 and 306 whether the data of the identified LSU track currently resides in any cache slot identified in column 312. Through use of information from any of tables 62, 72, 72' and 82 described in more detail elsewhere herein, the one or more LSU tracks of an LSU specified in an I/O operation can be mapped to one or more cache slots. Further, using the same data structures, the one or more physical address ranges corresponding to the one or more LSU tracks of the LSU may be mapped to one or more cache slots.

The tables 62, 72, 72', 82 and 300 may be stored in the GM 26 of the storage system 20a during operation thereof and may otherwise be stored in non-volatile memory (i.e., with the corresponding physical storage device). In addition, tables corresponding to LSUs accessed by a particular host may be stored in local memory of the corresponding one of the FAs 21a-n. In addition, RA 40 and/or the BEs 23a-n may also use and locally store portions of the tables 62, 72, 72', 82 and 300. Other data structures may be stored in any of GM 25b, memory 25a, GM segment 220a-n and/or dedicated local memories 22a-n.

Figure 5:
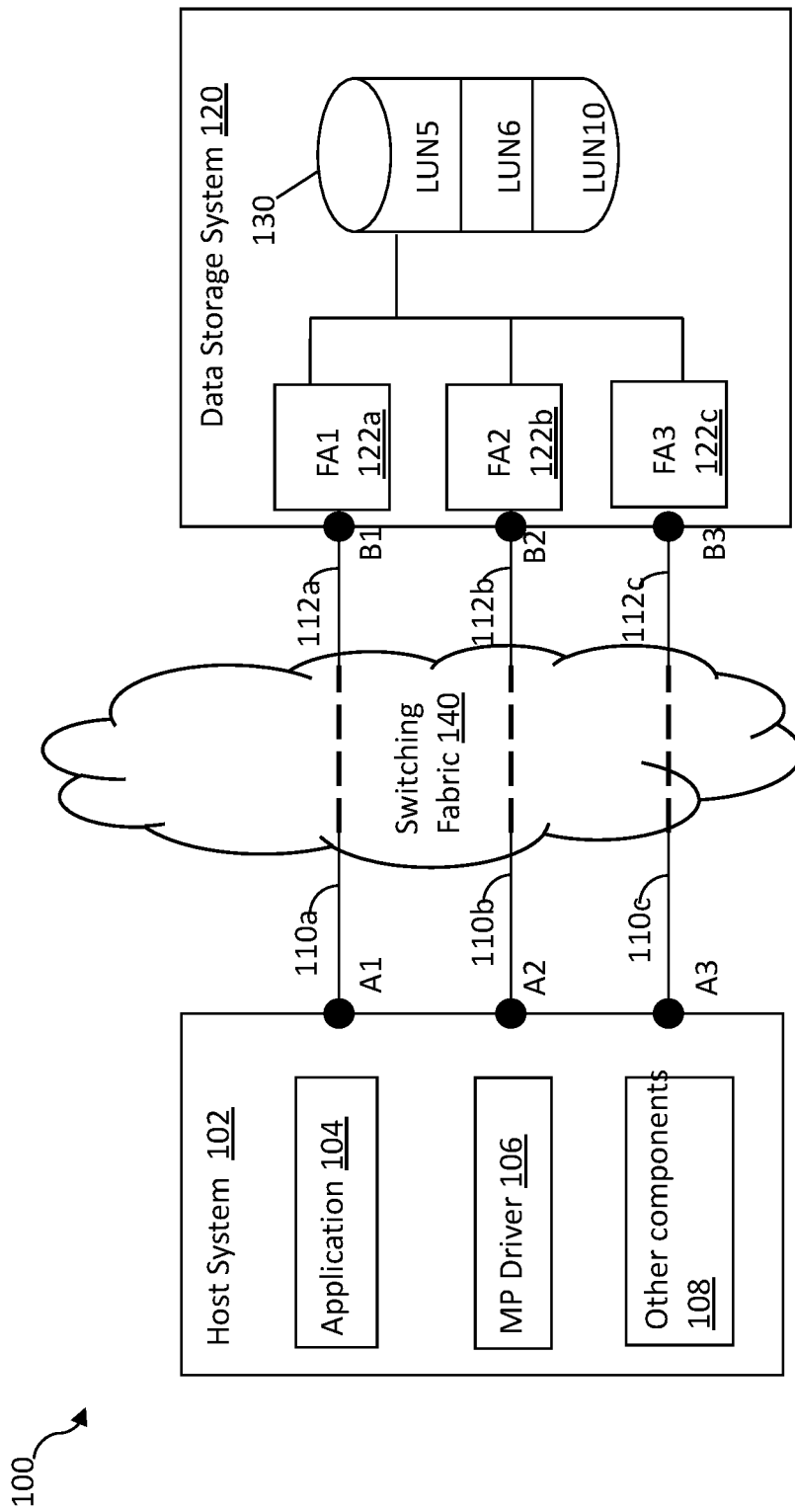
FIG. 5 is a block diagram illustrating an example of a system including a host system communicatively coupled to a data storage system via multiple I/O paths, according to embodiments of the invention.

FIG. 5 is a block diagram illustrating an example of a system 100 including a host system 102 communicatively coupled to a data storage system 120 via multiple I/O paths, according to embodiments of the invention. Other embodiments of system including a host system communicatively coupled to a data storage system via multiple I/O paths, for example, variations of system 100, are possible and are intended to fall within the scope of the invention. The system 100 may be implemented using one or more components of the system 10, for example, one or more storage systems 20a-n and/or one or more hosts 14a-14n, or variation thereof.

The system 100 may include a host system 102, switching fabric 140 (including one or more switches not shown) and data storage system 120. The host system 102 and data storage system 120 may communicate over one or more I/O paths through the switching fabric 140. Elements 110a-110c denote connections between the host system 102 and switching fabric 140. Element 112a-112c denote connections between the data storage system 120 and the switching fabric 140. Thus, switching fabric 140 may more generally considered a network providing the connectivity between the host system 102 and data storage system 120. The element 130 may represent a physical storage device of the data storage system 120, such as a rotating disk drive, flash-based or other solid state storage device, or the like, where the physical storage physical storage device 130 may be configured to include three LSUs—LUN5, LUN6 and LUN10. It should be noted that in the illustrative embodiment of FIG. 5, the system 100 includes only a single host system 102, single physical storage device 130 with 3 LSUs, and a single data storage system 120 for purposes of simplicity to illustrate the techniques herein. For example, each of the LSUs may be configured to have storage provisioned from multiple different physical storage devices rather than a single physical storage device, and multiple host systems having multiple applications executing thereon may communicate with the data storage system.

The host system 102 may be implemented as a server, and may include an application 104, a multi-path (MP) driver 106 and other components 108 such as, for example, one or more other device drivers and other code. An I/O request (specifying an I/O operation) from the application 104 may be communicated to the data storage system 120 using the MP driver 106 and one or more other components 108. The application 104 may be a database or other application which issues data operations, such as I/O operations, to the data storage system 120. Each of the I/O operations may be directed to a target device, such as one of the LSUs of physical storage device 130, configured to be accessible to the host system 102 over multiple I/O paths. As such, each of the I/O operations may be forwarded from the application 104 to the data storage system 120 over one of the possible multiple I/O paths.

The MP driver 106 may include functionality to perform any one or more different types of processing such as related to encryption, multi-pathing, mirroring, migration, and the like. For example, the MP driver 106 may include multi-pathing functionality for management and use of multiple I/O paths. For example, the MP driver 106 may perform I/O path selection to select one of the possible multiple I/O paths based on one or more criteria such as load balancing to distribute I/O requests for the target device across available active I/O paths. Load balancing may be performed to provide for better resource utilization and increased performance of the host system, data storage system, and network or other connection infrastructure. The MP driver 106 may be included in a commercially available product such as, for example, Dell EMC PowerPath® software made available by Dell EMC. Other components 108 of the host system 102 may include one or more other layers of software used in connection with communicating the I/O operation from the host system to the data storage system 120 such as, for example, Fibre Channel (FC) or SCSI drivers, a logical volume manager (LVM), or the like. The other components 108 may include software or other components used when sending an I/O operation from the application 104 to the data storage system 120, where such components may include those invoked in a call stack above and/or below the MP driver 106. For example, application 104 may issue an I/O operation which is communicated via a call stack including an LVM, the MP driver 106, and an FC or SCSI driver, e.g., as described elsewhere herein in more detail.

The data storage system 120 may include one or more physical storage devices, such as physical storage device 130, where each such physical storage device may be configured to store data of one or more LSUs. Each of the LSUs having data stored on the physical storage device 130 may be configured to be accessible to the host system 102 through one or more I/O paths. For example, all LSUs of physical storage device 130 may be accessible using ports of the three FAs 122a-122c, also denoted respectively as host adapters FA1, FA2 and FA3. The multiple I/O paths allow the application I/Os to be routed over multiple I/O paths and, more generally, allow the LSUs of physical storage device 130 to be accessed over multiple I/O paths. In the event that there is a component failure in one of the multiple I/O paths, I/O requests from applications can be routed over other alternate I/O paths unaffected by the component failure. The MP driver 106 may be configured to perform load balancing in connection with I/O path selection, as well as other processing. The MP driver 106 may be aware of, and may monitor, all I/O paths between the host system and the LSUs of the physical storage device 130 in order to determine which of the multiple I/O paths are active or available at a point in time, which of the multiple I/O paths are unavailable for communications, and to use such information to select an I/O path for host system-data storage system communications.

In the example of the system 100, each of the LSUs of the physical storage device 130 may be configured to be accessible through three I/O paths. Each I/O path may be represented by two path endpoints having a first endpoint on the host system 102 and a second endpoint on the data storage system 120. The first endpoint may correspond to a port of a host system component, such as a host bus adapter (HBA) of the host system 102, and the second endpoint may correspond to a port of a data storage system component, such as a port of an FA of the data storage system 120. In the example of the system 100, elements A1, A2 and A3 each denote a port of a host system 102 (e.g., a port of an HBA), and elements B1, B2 and B3 each denote a port of an FA of the data storage system 120. Each of the LSUs of the physical storage device 130 may be accessible over three I/O paths—a first I/O path represented by A1-B1, a second I/O path represented by A2-B2 and a third I/O path represented by A3-B3.

FIG. 6 is a block diagram illustrating an example of a plurality of logical layers 150 of a combination of a host system (e.g., the host system 102 of FIG. 3) and a data storage system (e.g., the data storage system 120) for processing an I/O request, according to embodiments of the invention. Other embodiments of a plurality of logical layers of a combination of a host system and a data storage system for processing an I/O request, for example, variations of logical layers 150, are possible and are intended to fall within the scope of the invention.

FIG. 6 provides further detail regarding various software layers that may be used in connection with the MP driver 106 of FIG. 5. The various software layers of 150 may generally form layers included in the runtime I/O stack, such as when an I/O request is issued by an application on a host system to a data storage system. The system includes an application layer 121 which includes application programs executing on the host system computer 102. The application layer 121 may refer to storage locations using an associated label or identifier such as a file name or file identifier. Below the application layer 121 is the file system layer 123 and the LVM layer 125*a* that maps the label or identifier specified by the application layer 121 to an LSU which the host system may perceive as corresponding to a physical storage device address (e.g., the address of one of the disk drives) within the storage system. Below the LVM layer 125*a* may be the MP (multi-path) driver 106 which handles processing of the I/O received from layer 125*a*. The MP driver 106 may include a base driver and one or more driver extension modules. The MP driver 106 may be implemented using a commercially available product such as Dell EMC PowerPath software.

Functionality for performing multi-pathing operations, such as may be performed by Dell EMC PowerPath software, may be included in one of the driver extension modules such as a multi-path extension module. As described above, the MP driver may perform processing in connection with multiple I/O path management and selecting one of a plurality of possible I/O paths for use in connection with processing I/O operations and communicating with the data storage system, such as data storage system 120 of FIG. 5. More generally, one or more layers between the application layer 121 and the MP driver 106, for example, the file system 123, may provide for mapping an LSU (such as used in connection with block-based storage), presented by the data storage system to the host system, to another logical data storage entity, such as a file, that may be used by the application layer 121. Below the MP driver 106 may be the SCSI driver 125*b* and a hardware (HW) driver 125*c*. The SCSI driver 125*b* may handle processing of a received I/O request from the MP driver 106 such as related to forming a request in accordance with one or more SCSI standards. The driver 125*c* may be a hardware driver that facilitates communication with hardware on the host system. The driver 125*c* may be, for example, a driver for an HBA of the host system which sends commands or requests to the data storage system and also receives responses and other communications from the data storage system. It should be appreciated that, in some embodiments, the ordering of the MP driver 106 and SCSI driver 125*b* may be reversed. That is, in some cases, the MP driver 106 sits below the SCSI driver 126*b*.

In some embodiments, layers 121-125*c* are implemented on a host (e.g., the host system 102) coupled to a data storage system (e.g., the data storage system 120) that is an intelligent data storage system having its own mapping layer 127 such that the LSU known or exposed to the host system may not directly correspond to a physical storage device such as a disk drive. In such embodiments, the LSU specified by the host system in the I/O operation may be further mapped by the data storage system using its mapping layer 127. For example, an LSU specified by the host system may be mapped by the data storage system to one or more physical drives, and multiple LSUs may be located on a same physical storage device, multiple physical drives, and the like.

The MP driver 106, as well as other components illustrated in FIG. 6, may execute in a kernel mode or another privileged execution mode. In some embodiments using a Unix-based OS, the MP driver 106 may be executed in kernel mode, whereas an application such as represented by application layer 121 may typically execute in user mode, or more generally, a non-privileged execution mode. It should be appreciated that embodiments of the invention may be implemented using any of a variety of different suitable OSs including a Unix-based OS, a Linux-based system, any one of the Microsoft Windows® OSs, or other OSs. Additionally, the host system may provide a virtualized environment and may execute, for example, VMware ESX® or VMware ESXi™ software providing bare-metal embedded hypervisors.

In operation, an application executing at application layer 121 may issue one or more I/O requests specifying I/O operations (e.g., read and write operations) to logical volumes (implemented by the LVM 125*a*) or files (implemented using the file system 123), whereby such I/O requests may be mapped to I/O communications (specifying the I/O operation) directed to LSUs of the data storage system. Such I/O operations from the application layer 121 may be directed to the MP driver 106 after passing through any intervening layers such as, for example, the layers 123 and 125*a*. Communications between an initiator port of the host system and a target port of a data storage system (e.g., target port of an FA) may include those related to I/O operations and other non-IO commands such as related to host system control operations. I/O operations may include, for example, read and write operations with respect to data stored on an LSU.

In connection with the SCSI standard, an I/O path may be defined between an initiator port of the host system and a target port of the data storage system. An I/O request may be sent from the host system (e.g., from a component thereof such as an HBA), which may be referred to as an initiator, originator or source with respect to the foregoing I/O path. The host system, as the initiator, sends I/O requests along the I/O path to a data storage system (e.g., a particular component thereof such as an FA having a port with a network address), which may be referred to as a target, destination, receiver, or responder. Each physical connection of an I/O path may be between a first endpoint which is a port of the host system (e.g., such as an HBA having ports such as denoted as A1-A3 of FIG. 5) and a second endpoint which is a port of an FA (e.g., such as B1-B3 of FIG. 5) in the data storage system. Through each such I/O path, one or more LSUs may be visible or exposed to the host system initiator through the target port of the data storage system.

Figure 7A:
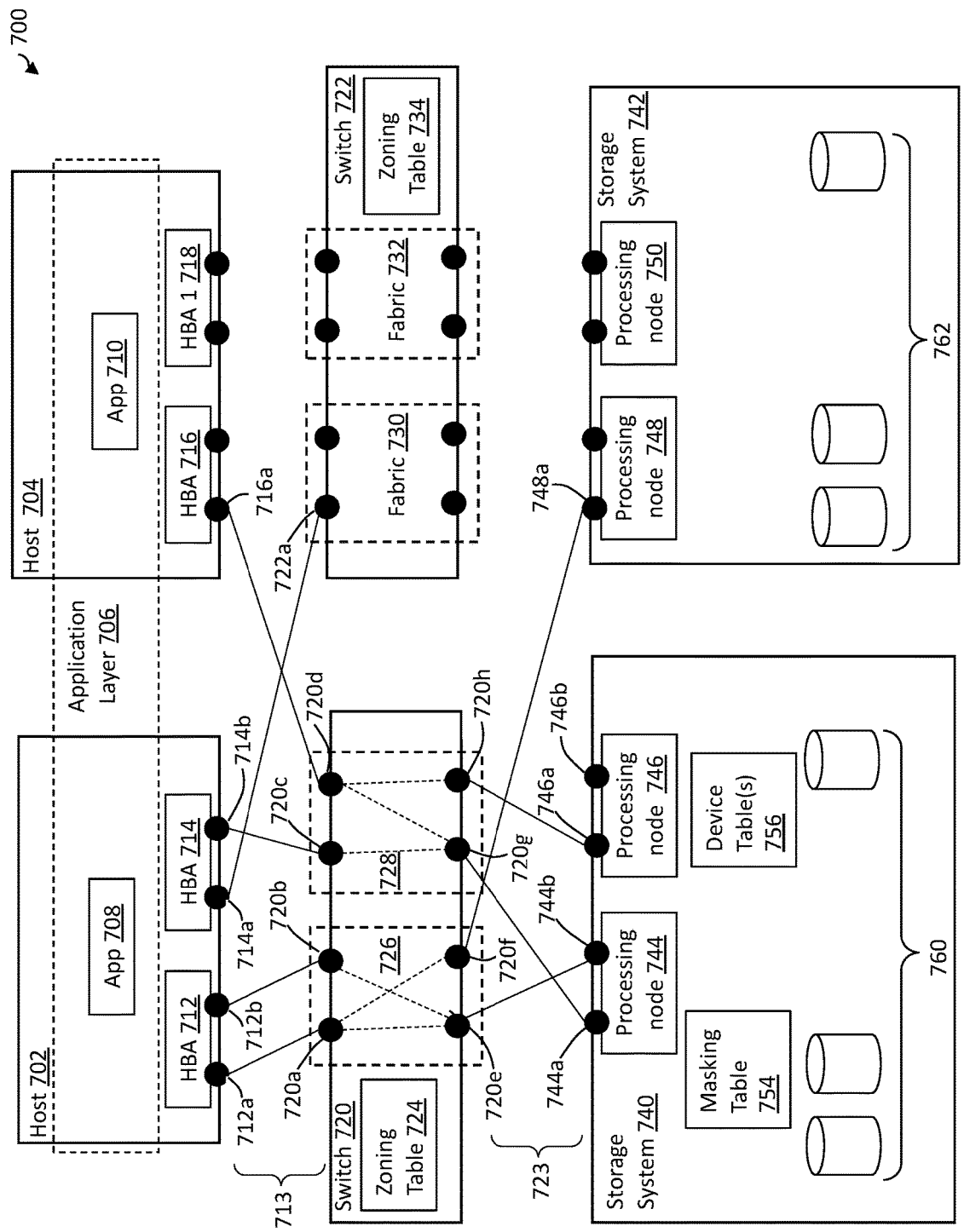
FIG. 7A is a block diagram illustrating an example of a storage network, according to embodiments of the invention.

FIG. 7A is a block diagram illustrating an example of a storage network 700, according to embodiments of the invention. Other embodiments of a storage network, for example, variations of storage network 700, are possible and are intended to fall within the scope of the invention. System 700 may include any of: hosts 702 and 704; switches 720 and 722; storage systems 740 and 742; other components; or any suitable combination of the foregoing.

It should be appreciated that, while only two hosts are shown, the system 700 may have significantly many more hosts, including tens, hundreds or even thousands more. The hosts 702 and 704 each may be physical host systems or virtual systems as part of a virtualized environment, and may be part of a host cluster and/or distributed across multiple physical devices and/or part of a cloud environment. Each of the hosts 702 and 704 may be a host system 102 described in relation to FIG. 5 or include any of the components thereof described herein. The application layer 706 may represents the collective application layers of the software stacks of the hosts 702 and 704, each of which may be an application layer 121 as described in relation to FIG. 6.

The host 702 may include any of: a portion of the application layer at 706; an application 708; HBAs 712 and 714; and host ports 712a, 712b, 714a and 714b. The portion of the application layer 706 running on the host 702 may include the application 708 and one or more other applications. The HBA 712 may include host ports 712a and 712b, and the HBA 714 may include host ports 714a and 714b. The HBAs 712 and 714 each may be separate discrete logical or physical components of the host 702, and the host 702 may include more than the two HBAs illustrated. Each of the host ports 712a, 712b, 714a and 714b may be connected to a switch port of switch 720 or 722 (referred to herein as a switch host port (SHP) or fabric port) by physical connections 713, which may be referred to herein as "host port links." Each such physical connection may be a cable and, in some embodiments, there is only enabled one physical connection between each host port and SHP (e.g., in accordance with a technology standard (e.g., FC)) as illustrated in FIG. 7A. That is, in some embodiments, each SHP is dedicated to one host port. FIG. 7A illustrates host ports 712a, 712b, 714a, 714b and 716a connected to SHPs over physical connections 713 in which there is only one physical connection 713 between each host port and each SHP.

The host 704 may include any of: a portion of the application layer at 706; an application 710; HBAs 716 and 718; and multiple host ports including host port 716a of HBA 716.

Figure 7B:
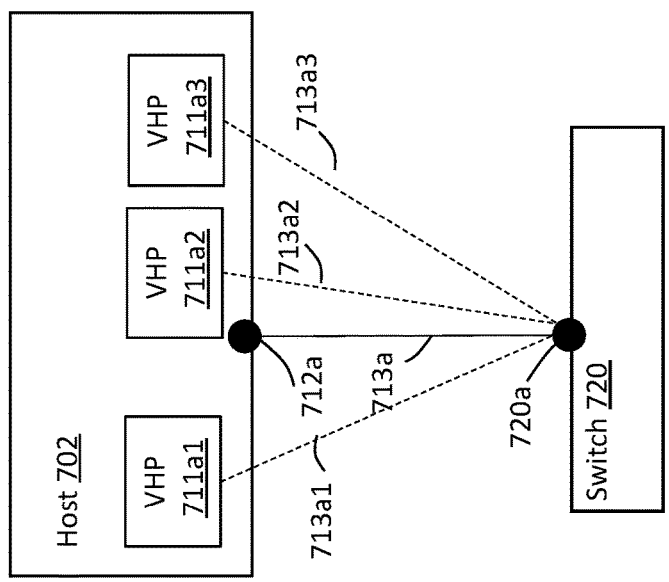
FIG. 7B is a block diagram illustrating an example of multiple logical I/O connections between a host and a switch, according to embodiments of the invention.

FIG. 7B is a block diagram illustrating an example of multiple logical I/O connections between a host and a switch, according to embodiments of the invention. Other embodiments of a storage network, for example, variations of what is illustrated in FIG. 7B, are possible and are intended to fall within the scope of the invention. As in FIG. 7A, physical host port 712a of host system 702 is connected to an SHP port 720a of the switch 720. Host system 702 may be configured to implement one or more forms of virtualization technology in which a plurality of virtual host ports (VHPs) 711a1, 711a2 and 711a3 are defined for a single physical host port 712a. That is, the host system 702 (e.g., a component thereof such as, for example, a multi-path driver (e.g., MP driver 106)) may have assigned different unique port IDs (e.g., WWNs) to each of VHPs 711a1, 711a2 and 711a3, even though they all map to the same physical host port 712a. Accordingly, one or more logical links 713a1, 713a2 and 713a3 corresponding to physical link 713a may be defined for VHPs 711a1, 711a2 and 711a3, respectively, between host 702 and switch 720.

It should be appreciated that switches (e.g., the switches 720 and 722) and storage systems (e.g., the storage systems 740 and 742) may not be configured to implement virtual host ports, and thus may not have knowledge that multiple port IDs map to the same physical host port. That is, from the perspective of a switch, storage system or other storage network component, the concept of a host port may be synonymous with a physical host port, as there is no concept of a virtual host port. For ease of reference, and in some cases taking into consideration a storage system's or switch's view of host ports, which does not include the concept of a virtual host port, the term "host port" may be used herein more generally, unqualified by the term "virtual" or "physical," to cover both virtual host ports and physical host ports.

Returning to FIG. 7A, the switch 720 may include any of: a zoning table 724, fabrics 726 and 728; ports 720a-h; other components; or any suitable combination of the foregoing. Each of the ports 720a-h ports configured to be connected (e.g., by a cable) to ports on a storage system (e.g., on a front-end of a storage system as part of a host adapter). Such switch ports may be referred to herein as switch storage ports ("SSPs") and the front-end ports of the storage system to which they connect referred to herein as front-end ports ("FEPs"). SSP may be connected to an FEP by physical connections 723, which may be referred to herein as "FEP links." Each such physical connection may be a cable and, in some embodiments, there is only enabled one physical connection between each SSP and FEP (e.g., in accordance with a technology standard (e.g., FC)) as illustrated in FIG. 7A. That is, in some embodiments, each SSP is dedicated to an FEP. FIG. 7A illustrates FEPs 744a, 744b and 746a connected to SSPs 720g, 720a and 720h, respectively, over physical connections 723 in which there is only one physical connection 723 between each FEP and each SSP.

The zoning table 724 may be a data structure that defines which host ports (as defined by a unique identifier such as a WWN), e.g., corresponding to host ports 712a, 712b, 714a, 714b and 716a, are enabled to communicate with which FEPs, for example, 744a, 744b, 746a, 746b and 748a. Zoning tables are described in more detail elsewhere herein. The switch 720 may use the information in the zoning table 724 to determine the internal switch connections between SHPs and SSPs to implement the defined zones, as illustrated by the dashed lines within switch 720 in FIG. 7A. The zoning table 724 or another data structure on switch 720 may define one or more logical fabrics, including logical fabrics 726 and 728, for example, by specifying the switch ports that are members of the logical fabrics.

A logical fabric is a logical entity that includes one or more SHPs and one or more SSPs as its members, for which I/O connectivity associated with the logical fabric are only permitted between the member SHPs and SSPs, and not with any SHP or SSP that is not a member of the fabric. A logical fabric may include SHPs and/or SSPs from different switches, or may include only SHPs and/or SSPs of a single switch, for example, all of the SHPs and/or SSPs of a switch or a subset thereof. A logical fabric may be considered to define a virtual SAN (i.e., "VSAN"). Each logical fabric may have a unique identifier referred to herein as a "fabric name," which may be synonymous with a VSAN name. For example, a data structure on the switch 720 or elsewhere may define that logical fabric 726 includes ports 720a, 720b, 720e and 720f.

The switch 722 may include any of: zoning table 734, logical fabrics 730 and 732; several ports including port 722a; other components; or any suitable combination of the foregoing. In some embodiments, one or both of switches 720 and 722 may be a Dell EMC Connectrix™ switch or director made available by Dell EMC.

The storage system 740 may include any of: a masking table 754; device table(s) 756; s 744 and 746; FEPs 744a, 744b, 746a and 746b; BEs (not shown); physical storage devices 760; other components; and any suitable combination of the foregoing. Device table(s) 756 may define properties of LSUs of the storage system 740, including logical devices (which may include thin devices) corresponding to physical storage devices 760, as described in more detail elsewhere herein. The masking table 754 may define which host ports (e.g., 712a, 712b, 714a, 714b, 716a) are permitted to communicate with which LSUs over which FEPs (e.g., 744a, 744b 746a, 746b). Masking tables are described in more detail elsewhere herein.

The storage system 742 may include any of the same or similar components as storage system 740, including processing node 748 and FEP 748a thereof, physical storage devices 762; a masking table (not shown); and device table(s) (not shown). In some embodiments, each of the storage systems 740 and/or 742 may be a storage system 20a and/or 120 described in relation to FIGS. 1 and 5, respectively, or include one more components and/or functionality thereof.

Storage systems (e.g., the storage systems 740 and/or 742) may maintain data structures (e.g., masking tables) that define I/O connectivity in terms of LSUs, FEPs and host ports; i.e., which ports of a host system ("host ports"; e.g., SCSI initiators) are permitted to perform I/O communications with which LSUs (e.g., identified with, and sometimes referred to as, a Logical Unit Numbers (LUNs)) over which FEPs (e.g., SCSI targets). Defining (including initially defining and later modifying) which host ports are permitted to perform I/O communications with which LSUs over which FEPs, for example, using a masking table or other data structure, may be referred to as configuring or defining I/O connectivity between a host port, FEP and LSU, or more simply as "masking."

Figure 8:
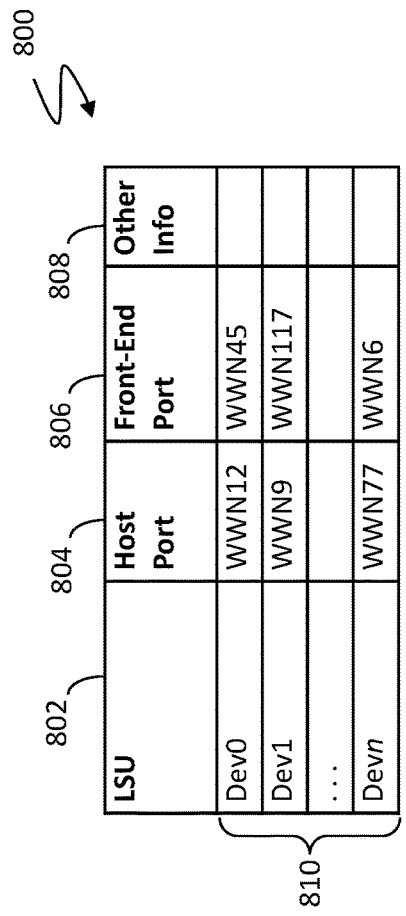
FIG. 8 is a block diagram illustrating an example of a data structure defining port connectivity permissions between a storage system and one or more host systems, according to embodiments of the invention.

FIG. 8 is a block diagram illustrating an example of a data structure 800 defining port connectivity permissions between a storage system and one or more host systems, according to embodiments of the invention. Other embodiments of a data structure defining port connectivity permissions between a storage system and one or more host systems, for example, variations of data structure 800, are possible and are intended to fall within the scope of the invention. In some embodiments, data structure 800 may be a masking table.

The data structure 800 may include a plurality of entries 810, each entry representing an LSU (e.g., logical device) identified in column 802 and specifying a host port (e.g., by World Wide Name (WWN)) in column 804 with which the identified LSU is enabled to communicate I/O over the FEP identified in column 806. Each entry 810 may correspond to an I/O connection on an I/O path between a host port and an FEP. Other information, for example, a host ID of the host system on which the host port resides, the HBA of the host port, other information relating to the host port learned during host registration, the FA associated with the FEP, a processing node (e.g., director board) on which the FEP resides, other physically discrete components of the storage system (e.g., an engine including the director board) within which the FEP resides, fabric name, and other information relating to the FEP, may be specified in column 808. A data structure other than a table, for example, a linked list and/or object-oriented data structure, may be used to record the same information.

It should be appreciated that one or more of the host port IDs specified in the data structure 800 may be IDs of virtual host ports, such that I/O connections corresponding to different entries, while they may appear to the storage system to have different physical host ports may in fact have the same physical host port that is mapped-to by the different virtual host ports.

To properly configure I/O connectivity between host ports, FEPs and LSUs, it may be necessary to know the permissible I/O paths between host ports and FEPs (e.g., across a switching fabric), which may be defined by zoning tables on one or more switches of a switching fabric. Switches may include zoning tables that define the logical connections between SHPs and SSPs of the switch; e.g., by specifying pairs of host port IDs (e.g., WWNs) and FEP IDs (WWNs), each pair specifying a host port ID and an FEP ID, each identified host port corresponding to a directly connected (e.g., by an FC cable) SHP of the switch and each identified FEP corresponding to a directly connected SSP of the switch. Thus, the zoning table of a switch defines permissible I/O paths between a host system and a storage system over the switch, each I/O path defined by (and including) a host port and an FEP. Such I/O paths may be referred to herein as "zoned I/O paths" or "enabled I/O paths," and the process of defining (including initially defining and later modifying) enabled I/O paths in a zoning table, or the resulting enabled I/O paths collectively, may be referred to herein as "zoning."

Figure 9:
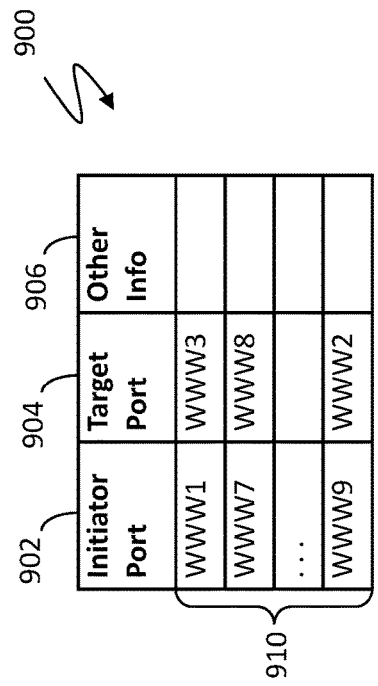
FIG. 9 is a block diagram illustrating an example of a data structure defining port connectivity permissions for a switch, according to embodiments of the invention.

FIG. 9 is a block diagram illustrating an example of a data structure 900 defining port connectivity permissions for a switch, according to embodiments of the invention. Other embodiments of a data structure defining port connectivity permissions for a switch, for example, variations of data structure 900, are possible and are intended to fall within the scope of the invention. The data structure 900 may be a zoning table, and may include a plurality of entries 910, each entry representing an initiator port (e.g., a host port) in column 902 and a target port (e.g., an FEP) in column 904 with which the initiator port is permitted to communicate over a switching fabric. Other information, for example, host, HBA, FA, processing node (e.g., director board), other physically discrete components the storage system (e.g., an engine including the director) corresponding to the target port, fabric name, etc., may be specified in column 906, where fabric name is an identifier of the logical fabric to which the specified initiator port and target port belong. A data structure other than a table, for example, a linked list and/or object-oriented data structure, may be used to record the same information.

It should be appreciated that one or more of the host port IDs specified in the data structure 900 may be IDs of virtual host ports, such that I/O paths corresponding to different entries, while they may appear to the switch (and other network components (e.g., a storage system) that consume the data structure) to have different physical host ports may in fact have the same physical host port that is mapped-to by the different virtual host ports.

In some embodiments of the invention, it may be desirable to migrate data from a source storage system to a target storage system, which will now be described.

Figure 10:
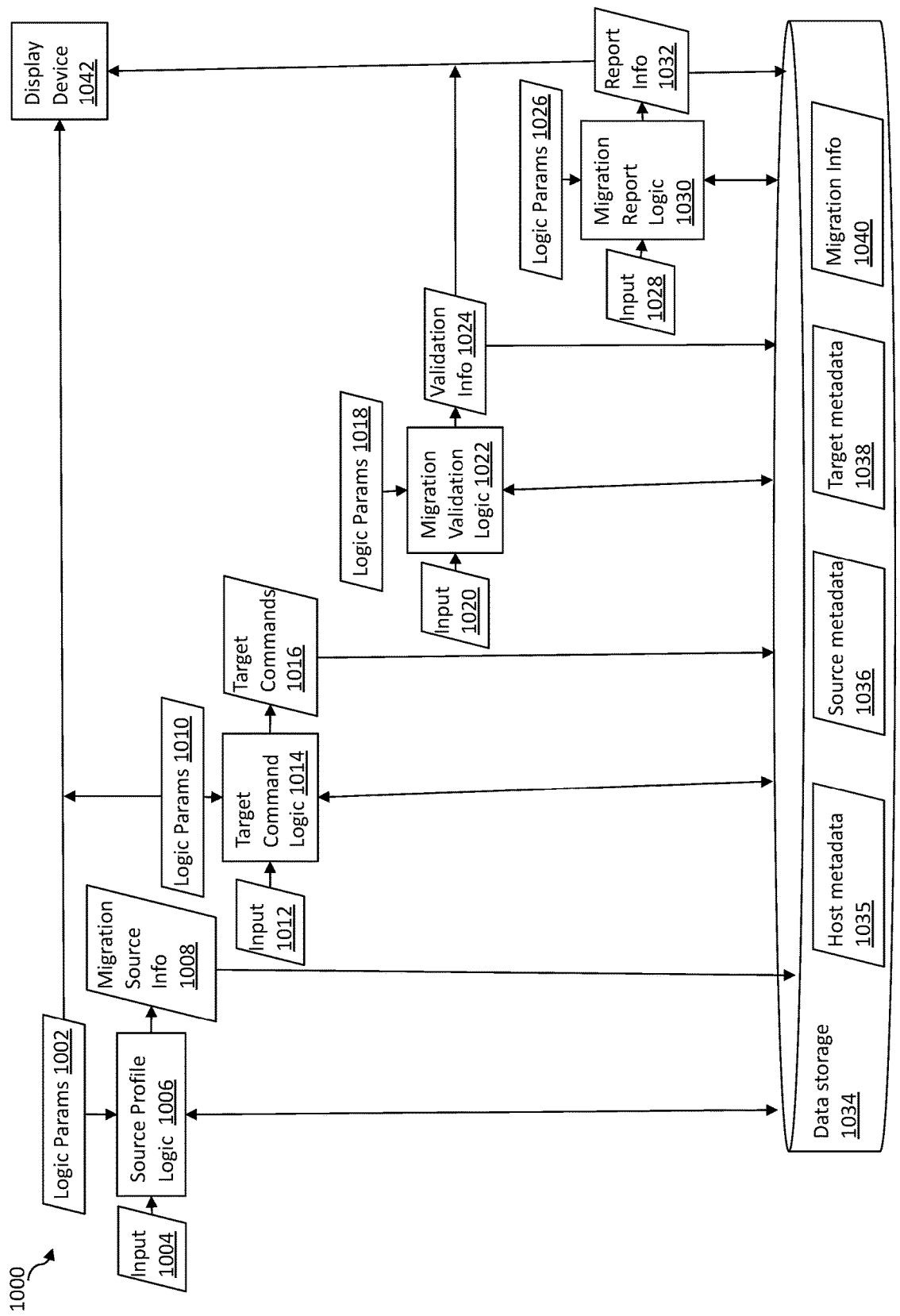
FIG. 10 is a block diagram of a system for migrating data from a source storage system to a target storage system, according to embodiments of the invention.

FIG. 10 is a block diagram of a system 1000 for migrating data from a source storage system to a target storage system, according to embodiments of the invention. Other embodiments of a system for migrating data from a source storage system to a target storage system, for example, variations of the system 1000, are possible and are intended to fall within the scope of the invention.

The system 1000 may include any of: source profile logic 1006; target command logic 1014; migration validation logic 1022; migration report logic 1030; data storage 1034; and other components. The data storage 1034 may reside on a storage system (e.g., the storage system 20*a* or 740); a host system (e.g., one of host systems 14*a*-*n* or 702); another component of the storage network 10; or a combination of the foregoing. The data storage 1034 may include any of: host metadata 1035; source metadata 1036; target metadata 1038; and migration information 1040. The host metadata 1036 may include metadata relating to a host system and applications executing thereon, including any of the metadata described in relation to FIGS. 1-9. The source metadata 1036 may include metadata relating to a source data storage system and data stored thereon, including any of the metadata described in relation to FIGS. 1-9. The target metadata 1036 may include metadata relating to a target data storage system and data stored thereon, including any of the metadata described in relation to FIGS. 1-9. The migration information 1040 may include any information generated as part of migrating data from a source storage system to a target storage system as described herein, including, but not limited to migration source information 1008; target commands 1016, validation information 1024 and report information 1032.

The host metadata 1035, source metadata 1036 and target metadata 1038 may be accessed by each of components 1006, 1014, 1022 and 1030 to generate their outputs, including portions of the migration information 1040. Further, the components 1006, 1014, 1022 and 1030 may access the migration information 1040 itself to generate their outputs, including portions of the migration information 1040.

The source profile logic 1006 may receive input 1004 and generate migration source information 1008, including any of the migration source information described herein. The input 1004 may include a CLI command specifying to generate migration source information, and may specify a host system ID, a source storage system ID and a target storage system ID. The source profile logic 1006 may be configured to access one or more of host metadata 1035, source metadata 1036, target metadata 1038 and migration information 1040, based on the specified input 1004, to generate the migration source information 1008. The source profile logic 1006 may be configured using logic parameters 1002. For example, in a software embodiment, the logic parameters 1002 may be software variables such that an authorized programmer may change the functionality of the source profile logic 1006 in software.

The source profile logic 1006 may be configured to store the migration source information 1008 as part of the migration information 1040 and to control display of the migration source information 1008 on a display device (e.g., computer screen) 1042. The source profile logic 1006 also may be configured to generate a migration ID to represent a migration session for migrating data of LUNs corresponding to the identified host system from the identified source system to the target storage system, and may store the migration ID as part of the migration information 1040. The source profile logic 1006 may be configured to implement one or more steps of a method 1100 described below in relation to the FIG. 11.

The target command logic 1014 may receive input 1012 and generate target configuration commands 1016, including any of the target configuration commands described herein. The input 1012 may include a CLI command specifying to generate target configuration commands, and may specify a migration ID, or alternatively may specify a host system ID, a source storage system ID and a target storage system ID. The target command logic 1014 may be configured to access one or more of host metadata 1035, source metadata 1036, target metadata 1038 and migration information 1040, based on the specified input 1012, to generate the target configuration commands 1016. The target command logic 1014 may be configured using logic parameters 1010. For example, in a software embodiment, the logic parameters 1010 may be software variables such that an authorized programmer may change the functionality of the target command logic 1014 in software. The target command logic 1014 may be configured to store the target commands 1016 as part of the migration information 1040 and to control display of the target configuration commands 1016 on the display device 1042. The source profile logic 1006 may be configured to implement one or more steps of the method 1100.

The migration validation logic 1022 may receive input 1020 and generate migration validation information 1024, including any of the migration validation information described herein. The input 1020 may include a CLI command specifying to migration validation information, and may specify a migration ID or alternatively a host system ID, a source storage system ID and a target storage system ID. The migration validation logic 1022 may be configured to access one or more of host metadata 1035, source metadata 1036, target metadata 1038 and migration information 1040, based on the specified input 1020, to generate migration validation information 1024. The migration validation logic 1022 may be configured using logic parameters 1018. For example, in a software embodiment, the logic parameters 1018 may be software variables such that an authorized programmer may change the functionality of migration validation logic 1022 in software. The migration validation logic 1022 may be configured to store the validation information 1024 as part of the migration information 1040 and to control display of the validation information 1024 on the display device 1042. The migration validation logic 1022 may be configured to implement one or more steps of the method 1100.

The migration report logic 1030 may receive input 1028 and generate migration report information 1032, including any of the migration report information described herein. The input 1028 may include a CLI command specifying to generate migration report information, and may specify a migration ID or alternatively a host system ID, a source storage system ID and a target storage system ID. The migration report logic 1030 may be configured to access one or more of host metadata 1035, source metadata 1036, target metadata 1038 and migration information 1040, based on the specified input 1028, to generate migration report information 1032. The migration report logic 1030 may be configured using logic parameters 1026. For example, in a software embodiment, the logic parameters 1026 may be software variables such that an authorized programmer may change the functionality of migration report logic 1030 in software. The migration report logic 1030 may be configured to store the migration report information 1032 as part of the migration information 1040 and to control display of the migration report information 1032 on the display device 1042. The migration report logic 1030 may be configured to implement one or more steps of the method 1100.

Figure 11:
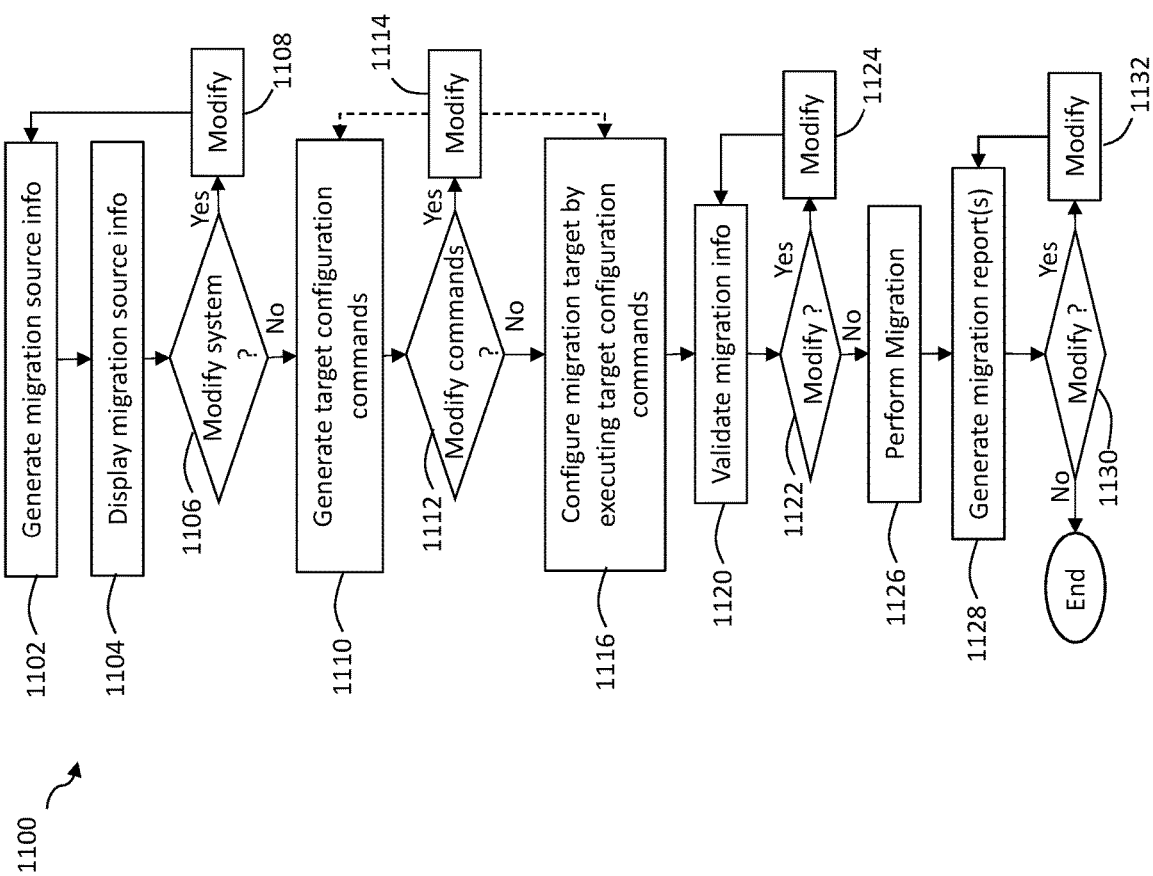
FIG. 11 is a flowchart of a method of migrating data from a source storage system to a target storage system, according to embodiments of the invention.

FIG. 11 is a flowchart of a method 1100 of migrating data from a source storage system to a target storage system, according to embodiments of the invention. Other embodiments of a method of migrating data from a source storage system to a target storage system, for example, variations of the method 1100, are possible and are intended to fall within the scope of the invention.

In a step 1102, migration source information may be generated reflecting the state of at least a first host system and source storage system, for example, by the source profile logic 1006. For example, the sources profile logic 1006 may generate migration source information in response to receiving to a host system ID and source storage system ID as part of input 1004 via a CLI, where such input 1004 also may include a target storage system ID. The step 1102 may include performance of a method 1200.

Figure 12:
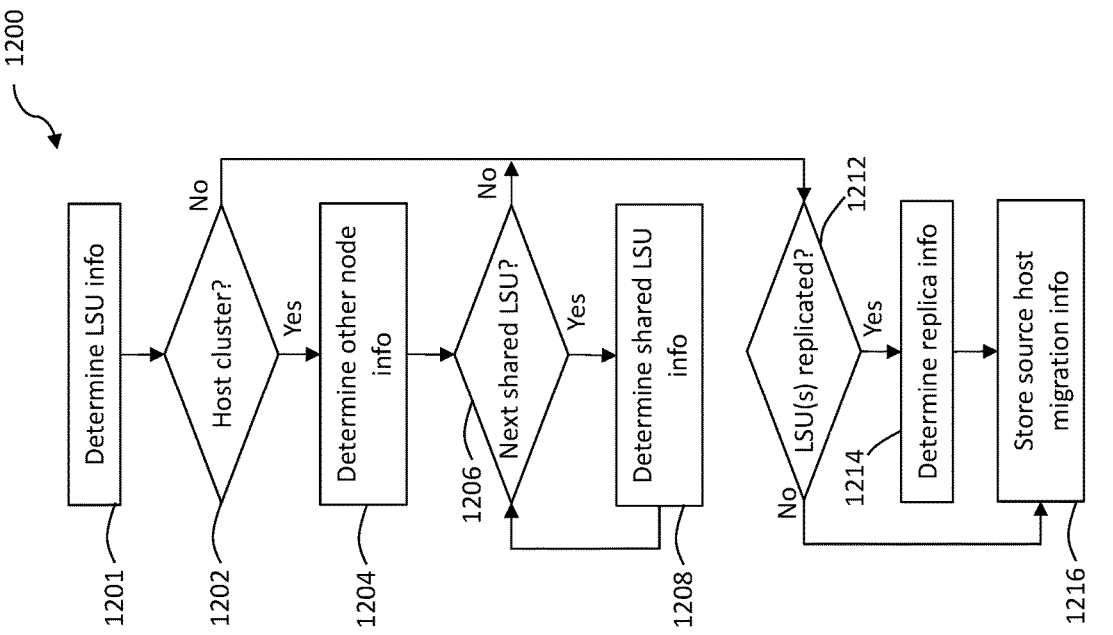
FIG. 12 is a flowchart of a method of generating migration source information, according to embodiments of the invention.

FIG. 12 is a flowchart of the method 1200 of generating migration source information, according to embodiments of the invention. Other embodiments of a method of generating migration source information, for example, variations of the method 1200, are possible and are intended to fall within the scope of the invention. The method 1200 may be performed by the source profile logic 1006.

In a step 1201, LSU information may be determined. For example, metadata on the storage system and/or host system, for example, a zoning table 900, masking table 800 and/or a variation thereof, may be used to determine which LSUs on the storage system have connectivity to ports on the host system.

In some embodiments of the invention, the LSUs determined are logical devices (e.g., LUNs), and the LSUs depicted in the zoning table 900 and the masking table 800 are logical devices. In such embodiments, the logical devices connected to host ports may be determined by accessing entries in the zoning table 900 and/or the masking table 800 (or other data structures (e.g., indexes) created therefrom) corresponding to the logical devices and the host ports. In other embodiments, the LSUs determined are logical devices, and the LSUs depicted in the zoning table 900 and the masking table 800 are storage groups (SGs), where each SG includes a plurality of logical devices. Other metadata (not shown) may define which logical devices belong to which storage groups. In such embodiments, the logical devices connected to host ports may be determined by accessing entries in the zoning table 900 and the masking table 800 (or other data structures created therefrom) corresponding to the host ports and the SGs to which the logical devices belong.

In some embodiments, host ports may be referred to as initiators or initiator ports, and one or more host ports (e.g., of a same HBA) may be defined to be part of a same initiator group (IG). Furthermore, rather than host ports and initiators, the zoning table 900 and the masking table 800 may map initiator groups to LSUs and storage system ports. In such embodiments, determining the LSUs (e.g., logical devices) connected to host ports may include accessing entries in the zoning table 900 and/or the masking table 800 (or other data structures created therefrom) corresponding to the IGs and the LSUs (e.g., logical devices of SGs to which the logical devices belong).

Other metadata resources on the host system and/or source storage system may be accessed to determine migration source information, for example, any of the data structures described herein.

The LSU information determined in the step 1201 may include one or more LSUs of the source storage system for data generated by a plurality of applications executing on the host system, and the size and number such LSUs. The migration source information also may specify one or more host ports providing connectivity to the one or more LSUs, and the login status of such ports.

In a step 1202, it may be determined whether the host system is a member (i.e., node) of a host cluster, for example, from metadata available on the host system and/or source storage system.

If it is determined that the host system is a member of a host cluster, information about other nodes of the host cluster may be determined in a step 1204, for example, from metadata available on the host system and/or source storage system. The shared LSUs of the host cluster and information thereof then may be determined, for example, from metadata available on the host system and/or source storage system. For example, in a step 1206, it may be determined whether there is a next shared LSU of the node cluster. On a first pass through the steps 1206, the answer should be affirmative, and the shared LSU information may be determined in a step 1208.

If it is determined that there is not a next shared LSU in the step 1206, or if it is determined that the host system is not a member of a host cluster in the step 1202, then it may be determined whether one or more migrating LSUs are replicated in the step 1212, for example, by looping through each LSU determined in the step 1201 and determining whether it is replicated from replication metadata on the host system or the source storage system. For each migrating LSU determined to be replicated in the step 1212, the replica information for each LSU may be determined, for example, the secondary and perhaps tertiary storage systems on which the LSU is replicated, and the LSU ID of the second replica LSU (and perhaps tertiary replica LSU) of the migrating LSU. The replica information also may include the size and number such replica LSUs as well as other information about the replica LSUs.

Any of the source migration information determined by performance of the method 1200 may be stored, for example, in a flat file, e.g., by the source profile logic 1006 as part of the migration source information 1008.

Returning to the method 1100, any of the migration source information determined by performance of the step 1102 (e.g., by performance of the method 1200) may be displayed to a user in a step 1104. For example, the source profile logic 1006 may control displaying at least a portion of such information, as part of the migration source information 1008 on the display device 1042. For example, the displayed information may include a name (i.e., label) of the host system for whom the migration is being performed ("the migration host") and an ID of the source storage system and target storage system. The displayed information may include a listing of each host port (i.e., initiator) of the migration host that has connectivity to the storage system for one or more of the LSUs to be migrated. The listing may include a row for each such host port, where the row may include the name (i.e., label) of the host port, an ID (e.g., WWN) of the host port and an LSU (e.g., SG) of the source storage system mapped to the host port.

The displayed information further may list one or more groups of LSUs (e.g., logical devices) to be migrated, each group corresponding to an LSU size (capacity), and specify the number of LSUs in each group. Further, for each group, the displayed information further may specify the number of secondary and/or tertiary replica LSUs. The IDs of the storage systems on which one or more replica LSUs (if any) is stored also may be displayed. If the LSUs are logical devices, the displayed information further may specify the SGs of the replica storage system(s) of which the logical storage devises are members.

The displayed information may include more detailed information about the LSUs (e.g., SGs and/or logical devices), including a listing of each LSU being migrated. The listing may include a label of each LSU and the source storage system ID of the LSU. If the LSU is an SG, the listing may specify groups of logical devices included in the SG, where such groups may be based on logical device size. For each group of an SG, the listing may specify the logical device size of the group and the number of logic devices in the group (i.e., that have the logical device size of the group).

If the migrating host is a node of a host cluster, the displayed information may include information about the other nodes of the host cluster, and may specify which LSUs being migrated are LSUs shared between members of the cluster and which are specific (local) to the migrating host. In such embodiments, the displayed information may be include information bifurcated between shared LSUs and non-shared (i.e., local) LSUs of the migrating host, and may include any of the information describe above or elsewhere herein for both shared and local LSUs.

The displayed information may include further information, and may be able to provide different information based on CLI commands or command parameters entered by a user and/or based on modified parameter logic. For example, the source profile logic 1006 may be configured to produce different migration source reports based for different CLI commands and command parameters. For example, some reports may be designed to be summary in nature and other reports more detailed, so that a user can drill down into more detail if desired.

In a step 1106, it may be determined whether to modify the host system or the source storage system, for example, based on the migration source information. If the host system or source storage system is modified, the method 1100 may return to the step 1102; otherwise, in a step 1110, target configuration commands may be generated, for example, by the target command logic 1014. The target command logic 1014 may be configured to interface with one or more APIs for the source storage system and the target storage system, to extract information from both storage systems in accordance with such API(s), and to generate target configuration commands in accordance with such API(s).

In a step 1112, it may be determined (e.g., by a user) whether to modify the target configuration commands. If it is determined to modify the target configuration commands, the target configuration commands may be modified in the step 1114. The target configuration commands may be modified using command line parameters of the input 1012 to the target command logic 1014 to generate different target configuration commands 1016, or by modifying the logic of the target command logic 1014 itself using logic parameters 1010 and then generating different target configuration commands 1016. The target configuration commands 1016 also may be modified by modifying the target configuration commands themselves, for example, by editing a file (e.g., a flat file) that includes the target configuration commands 1016.

If the target configuration commands are modified in the step 1114 by modifying the command line parameters or the logic parameters 1010, then the method 1100 may return to the step 1110. If the target configuration commands are modified by editing the target configuration commands themselves, or it is determined to not modify the commands in the step 1112, the method 1100 may proceed to a step 1116, in which the target storage system may be configured by executing the target configuration commands. The target configuration commands may be executed by parsing a flat file that includes the target configuration commands and sending communications to target system components in accordance with APIs thereof, or may be executed independently of the target configuration command information produced by the step 1110.

In a step 1120, migration information may be validated, for example, in response to a CLI command entered by a user. For example, the step 1120 may be performed by the migration validation logic 1022 in response to the input 1020 including the CLI command. Such validation may include generating second migration source information indicative of a state of the host system and the source storage system at a point in time later than the point in time at which the migration source information was first generated (e.g., in the step 1102), for example, close to the time at which the migration is scheduled to be performed. Such validation also may include generating migration target information indicative of a state of the configured target system (e.g., configured in the step 1116) at the point in time, and comparing the second migration source information and the migration target information. Each of the second migration source information and the migration target information may include any of the information described above in relation to the step 1102.

The validation may include comparing LSU information (e.g., the number of LSUs, types of LSUs and sizes of LSUs), including shared LUN information (e.g., number, size), replica information (e.g., the number of replicated LSUs, replica storage system information, host system information, for example, port IDS (e.g., WWNs) of the host systems ports corresponding to the LSUs; other information; or any suitable combination of the foregoing. Any discrepancies may be reported to the user, for example, as part of validation information displayed to the user.

Validating the migration information (e.g., any such information described herein) in the step 1120 may include displaying the validation information to a user, including displaying any discrepancies between source storage system information and target storage system information. The step 1120 may include displaying any of the second migration source information and the migration target information, for example, any of the information described in relation to the step 1104. For ease of visual comparison, the step 1120 may include displaying information of a first type (e.g., SG listing, logical device group listing, login information, replication information, etc.) from the second migration source information side-by-side or directly above or below the corresponding information of the first type from the migration target information. Discrepancies may be highlighted in some manner (e.g., font color, capital letters, punctuation, other symbols, etc.).

In a step 1122, in response to the display of the migration information and/or being notified of a discrepancy, the user may decide whether to modify the configuration of the source storage system, target storage system and/or host system. If the user decides to do so, one or more modifications may be performed in the step 1124, followed by a return to the step 1120 to re-validate the migration info, which should include re-generating migration source and/or target information based on the changes made in the step 1124 and comparing such information as described above. In some embodiments, changes made to the source target system in the step 1124 may result in a return to the step 1110 of the method 1000. It should be appreciated that the steps 1120, 1122 and 1124 may be performed multiple times. Any information generated as part of the validation process may be stored, for example, in one or more flat files.

If it is determined in the step 1122 that no modifications are desired (e.g., after one or more passes through steps 1120, 1122 and 1124), the migration may be performed in the step 1126. At any point in time following performance of the migration, one or more migration reports (e.g., the report information 1032) may be generated in a step 1128, for example, by the migration report logic 1030. Any of a variety of information related to the migration may be reported. For example, the migration report logic 1030 may be configured to produce different reports or variations thereof based on CLI commands and command parameters included in the input 1028.

For example, for ease of review, one or more of such migration reports may be configured to present information of a first type (e.g., SG listing, logical device group listing, login information, replication information, etc.) from the last migration source information generated before the migration side-by-side, or immediately above or below, information of the first type from target storage system information generated after the migration. Any discrepancies may be highlighted in some manner (e.g., font color, capital letters, punctuation, other symbols, etc.).

Various embodiments of the invention may be combined with each other in appropriate combinations. Additionally, in some instances, the order of steps in the flowcharts, flow diagrams and/or described flow processing may be modified, where appropriate. It should be appreciated that any of the methods described herein, including methods 1100 and 1200, or parts thereof, may be implemented using one or more of the systems and/or data structures described in relation to FIGS. 1-10 or components thereof. Further, various aspects of the invention may be implemented using software, firmware, hardware, any suitable combination thereof and/or other computer-implemented modules or devices having the described features and performing the described functions. Logic that when executed performs methods described herein, steps thereof or portions of such methods or steps, may be implemented as software, firmware, hardware, or any suitable combination thereof.

Software implementations of embodiments of the invention may include executable code that is stored on one or more computer-readable media and executed by one or more processors. Each of the computer-readable media may be non-transitory and include a computer hard drive, ROM, RAM, flash memory, portable computer storage media such as a CD-ROM, a DVD-ROM, a flash drive, an SD card and/or other drive with, for example, a universal serial bus (USB) interface, and/or any other appropriate tangible or non-transitory computer-readable medium or computer memory on which executable code may be stored and executed by a processor. Embodiments of the invention may be used in connection with any appropriate OS.

As used herein, an element or operation recited in the singular and preceded with the word "a" or "an" should be understood as not excluding plural elements or operations, unless such exclusion is explicitly recited. References to "one" embodiment or implementation of the present disclosure are not intended to be interpreted as excluding the existence of additional embodiments that also incorporate the recited features. Furthermore, a description or recitation in the general form of "at least one of [a], [b] or [c]," or equivalent thereof, should be generally construed to include [a] alone, [b] alone, [c] alone, or any combination of [a], [b] and [c]. In addition, use of a an ordinal term, e.g., "first," "second" or the like, to qualify a term for an item having multiple instances of the same name does not necessarily indicated a priority, precedence or temporal order between the instances unless otherwise indicated, but rather such ordinal terms may be used merely to distinguish between the separate instances.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:
1. A method comprising:
at a first point in time:
receiving a host system identifier identifying a host system, a source storage system identifier identifying a source storage system from which to migrate data and a target storage system identifier identifying a target storage system to which to migrate data at a later time; and
in response to receiving the first host system identifier of the host system, the source storage system identifier of the source system from which to migrate data, and the target storage system identifier of the target system to which to migrate data, generating first migration source information indicative of a state of the host system and the source storage system at the first point in time, said generating first migration source information including:
determining, using a zoning table for a switch and a masking table of the source storage system, a plurality of logical devices that are included in the source storage system identified by the source system identifier and that are connected to host ports of the host system identified by the host system identifier, and wherein the plurality of logical devices store data generated by a plurality of applications executing on the host system; and
at a second point in time, validating migration information, wherein the second point in time is after the first point in time and prior to the later time when data is migrated from the source storage system to the target storage system, and wherein the second point in time is after the target storage system has been configured for migration based on the first migration source information, said validating migration information including:
generating second migration source information indicative of a state of the host system and the source storage system at the second point in time;
generating migration target information indicative of a state of the target storage system at the second point in time after the target storage system has been configured for migration based on the first migration source information;
comparing the second migration source information and the migration target information; and
determining, in accordance with said comparing the second migration source information and the migration target information, one or more discrepancies between the second migration source information and the migration target information;
responsive to said determining one or more discrepancies between the second migration source information and the migration target information at the second point in time, modifying a current configuration of one or more of: the host system, the source storage system and the target storage system; and
responsive to said modifying the current configuration, revalidating second migration information at a third point in time which is subsequent to the second point in time and prior to the later point in time when data is migrated from the source storage system to the target storage system.

2. The method of claim 1, wherein generating the first migration source information includes:
   determining whether the host system is a member of a cluster of host systems serving at least a subset of the plurality of the applications to users; and
   if it is determined that the host system is a member of a cluster, determining at least a subset of the plurality of logical devices that are shared by the host systems of the cluster.

3. The method of claim 1, wherein generating the first migration source information includes: determining whether the source storage system is replicated to a replica storage system; and
   if the source storage system is replicated to a replica storage system, obtaining information about the replica storage system.

4. The method of claim 1, further comprising:
   generating target storage configuration commands for migrating the data from the source storage system to the target storage system; and
   displaying the target storage configuration commands to a user.

5. The method of claim 1, further comprising:
   receiving a migration report command from a user via a command line interface, wherein the migration report command includes one or more command parameters; and
   generating a migration report based on the migration report command.

6. The method of claim 1, wherein the first migration source information, the second migration source information and the migration target information are generated using a scripting language that is agnostic to storage system type and host system type.

7. The method of claim 1, wherein the first migration source information is generated in response to receiving a command via a command line interface, wherein the command specifies the host system identifier, the source storage system identifier and the target storage system identifier as command parameters.

8. A system comprising executable logic that implements a method including:
   at a first point in time:
      receiving a host system identifier identifying a host system, a source storage system identifier identifying a source storage system from which to migrate data and a target storage system identifier identifying a target storage system to which to migrate data at a later time; and
      in response to receiving the first host system identifier of the host system, the source storage system identifier of the source system from which to migrate data, and the target storage system identifier of the target system to which to migrate data, generating first migration source information indicative of a state of the host system and the source storage system at the first point in time, said generating first migration source information including:
         determining, using a zoning table for a switch and a masking table of the source storage system, a plurality of logical devices that are included in the source storage system identified by the source system identifier and that are connected to host ports of the host system identified by the host system identifier, and wherein the plurality of logical devices data generated by a plurality of applications executing on the host system; and
   at a second point in time, validating migration information, wherein the second point in time is after the first point in time and prior to the later time when data is migrated from the source storage system to the target storage system, and wherein the second point in time is after the target storage system has been configured for migration based on the first migration source information, said validating migration information including:
      generating second migration source information indicative of a state of the host system and the source storage system at the second point in time;
      generating migration target information indicative of a state of the target storage system at the second point in time after the target storage system has been configured for migration based on the first migration source information; and
      comparing the second migration source information and the migration target information; and
      determining, in accordance with said comparing the second migration source information and the migration target information, one or more discrepancies between the second migration source information and the migration target information;
   responsive to said determining one or more discrepancies between the second migration source information and the migration target information at the second point in time, modifying a current configuration of one or more of: the host system, the source storage system and the target storage system; and
   responsive to said modifying the current configuration, revalidating second migration information at a third point in time which is subsequent to the second point in time and prior to the later point in time when data is migrated from the source storage system to the target storage system.

9. The system of claim 8, wherein generating the first migration source information includes:
   determining whether the host system is a member of a cluster of host systems serving at least a subset of the plurality of the applications to users; and
   if it is determined that the host system is a member of a cluster, determining at least a subset of the plurality of logical devices that are shared by the host systems of the cluster.

10. The system of claim 8, wherein generating the first migration source information includes: determining whether the source storage system is replicated to a replica storage system; and
    if the source storage system is replicated to a replica storage system, obtaining information about the replica storage system.

11. The system of claim 8, wherein the method further includes:
    generating target storage configuration commands for migrating the data from the source storage system to the target storage system; and
    displaying the target storage configuration commands to a user.

12. The system of claim 8, wherein the method further includes:
    receiving a migration report command from a user via a command line interface, wherein the migration report command includes one or more command parameters; and
    generating a migration report based on the migration report command.

13. The system of claim 8, wherein the first migration source information, the second migration source information and the migration target information are generated using a scripting language that is agnostic to storage system type and host system type and wherein the first migration source information is generated in response to receiving a command via a command line interface, wherein the command specifies the host system identifier, the source storage system identifier and the target storage system identifier as command parameters.

14. Computer-readable media having software stored thereon comprising:
executable code that controls, at a first point in time:
receiving a host system identifier identifying a host system, a source storage system identifier identifying a source storage system from which to migrate data and a target storage system identifier identifying a target storage system to which to migrate data at a later time; and
in response to receiving the first host system identifier of the host system, the source storage system identifier of the source system from which to migrate data, and the target storage system identifier of the target system to which to migrate data, generating first migration source information indicative of a state of the host system and the source storage system at the first point in time, said generating first migration source information including:
determining, using a zoning table for a switch and a masking table of the source storage system, a plurality of logical devices that are included in the source storage system identified by the source system identifier and that are connected to host ports of the host system identified by the host system identifier, and wherein the plurality of logical devices store data generated by a plurality of applications executing on the host system; and
executable code that controls, at a second point in time, validating migration information, wherein the second point in time is after the first point in time and prior to the later time when data is migrated from the source storage system to the target storage system, and wherein the second point in time is after the target storage system has been configured for migration based on the first migration source information, said validating migration information including:
generating second migration source information indicative of a state of the host system and the source storage system at the second point in time;
generating migration target information indicative of a state of the target storage system at the second point in time after the target storage system has been configured for migration based on the first migration source information;
comparing the second migration source information and the migration target information; and
determining, in accordance with said comparing the second migration source information and the migration target information, one or more discrepancies between the second migration source information and the migration target information; and
executable code that, responsive to said determining one or more discrepancies between the second migration source information and the migration target information at the second point in time, controls modifying a current configuration of one or more of: the host system, the source storage system and the target storage system; and
executable code that, responsive to said modifying the current configuration, controls revalidating second migration information at a third point in time which is subsequent to the second point in time and prior to the later point in time when data is migrated from the source storage system to the target storage system.

15. The computer-readable media of claim 14, wherein generating the first migration source information includes:
determining whether the host system is a member of a cluster of host systems serving at least a subset of the plurality of the applications to users; and
if it is determined that the host system is a member of a cluster, determining at least a subset of the plurality of logical devices that are shared by the host systems of the cluster.

16. The computer-readable media of claim 14, wherein generating the first migration source information includes:
determining whether the source storage system is replicated to a replica storage system; and
if the source storage system is replicated to a replica storage system, obtaining information about the replica storage system.

17. The computer-readable media of claim 14, wherein the software further comprises:
executable code that controls generating target storage configuration commands for migrating the data from the source storage system to the target storage system; and
executable code that controls displaying the target storage configuration commands to a user.

18. The computer-readable media of claim 14, wherein the software further comprises:
executable code that controls receiving a migration report command from a user via a command line interface, wherein the migration report command includes one or more command parameters; and
executable code that controls generating a migration report based on the migration report command, wherein the first migration source information, the second migration source information and the migration target information are generated using a scripting language that is agnostic to storage system type and host system type.

19. The method of claim 1, wherein said one or more discrepancies includes a first discrepancy with respect to first connectivity between a first host port of the host system and a first logical device of the plurality of logical devices of the source storage system and second connectivity between the first host port and a first target logical device of the target storage system, and
wherein said modifying the current configuration includes performing, in accordance with the first discrepancy, a first modification to the current configuration of any of: the host system, the source storage system and the target storage system.

20. The method of claim 1, wherein said comparing the second migration source information and the migration target information of said validating migration information includes:
comparing first logical device information including sizes and types of logical devices of the second migration source information with corresponding second logical device information including sizes and types of the migration target information;

comparing shared logical device information regarding logical devices shared by multiple host of the second migration source information with corresponding shared logical device information regarding logical devices shared by multiple hosts of the migration target information; and comparing first host system information including port identifiers of host system ports corresponding to logical devices of the second migration source information with corresponding second host system information including port identifiers of host system ports corresponding to logical devices of the migration target information.

\* \* \* \* \*